(12) United States Patent
Angell et al.

(10) Patent No.: US 9,031,858 B2
(45) Date of Patent: May 12, 2015

(54) USING BIOMETRIC DATA FOR A CUSTOMER TO IMPROVE UPSALE AD CROSS-SALE OF ITEMS

(75) Inventors: Robert Lee Angell, Salt Lake City, UT (US); James R. Kraemer, Santa Fe, NM (US)

(73) Assignee: International Business Machines Corporation, Armonk, NY (US)

(*) Notice: Subject to any disclaimer, the term of this patent is extended or adjusted under 35 U.S.C. 154(b) by 2152 days.

(21) Appl. No.: 11/861,729

(22) Filed: Sep. 26, 2007

(65) Prior Publication Data

US 2008/0249867 A1   Oct. 9, 2008

Related U.S. Application Data

(63) Continuation-in-part of application No. 11/695,983, filed on Apr. 3, 2007.

(51) Int. Cl.
*G06Q 30/00* (2012.01)
*G06Q 30/06* (2012.01)
*G06Q 30/02* (2012.01)

(52) U.S. Cl.
CPC .............. *G06Q 30/06* (2013.01); *G06Q 30/02* (2013.01); *G06Q 30/0225* (2013.01); *G06Q 30/0226* (2013.01); *G06Q 30/0236* (2013.01); *G06Q 30/0255* (2013.01); *G06Q 30/0271* (2013.01)

(58) Field of Classification Search
USPC .......................................................... 705/14
See application file for complete search history.

(56) References Cited

U.S. PATENT DOCUMENTS

| 4,929,819 | A | 5/1990 | Collins, Jr. |
| 5,091,780 | A | 2/1992 | Pomerleau |
| 5,231,483 | A | 7/1993 | Sieber et al. |
| 5,233,513 | A | 8/1993 | Doyle |
| 5,511,006 | A | 4/1996 | Tachibana et al. |
| 5,729,697 | A | 3/1998 | Schkolnick et al. |

(Continued)

FOREIGN PATENT DOCUMENTS

| GB | 2247592 A | 3/1992 |
| JP | 2003187335 A | 7/2003 |

(Continued)

OTHER PUBLICATIONS

U.S. Appl. No. 11/695,983, filed Apr. 3, 2007, Angell et al.

(Continued)

*Primary Examiner* — Alvin L Brown
(74) *Attorney, Agent, or Firm* — Yee & Associates, P.C.; John R. Pivnichny

(57) ABSTRACT

A computer implemented method, apparatus, and computer usable program code for generating customized marketing messages to increase purchases by a customer. In one embodiment, an item selected by the customer is identified to form a selected item. Biometric readings for the customer are received from a set of biometric devices associated with a retail facility to form the biometric data. The biometric data is data regarding a set of physiological responses of the customer. A set of items is selected from a list of items associated with the selected item using the biometric data for the customer to form a set of promoted items. A customized marketing message for the customer is generated using a set of personalized marketing message criteria for the customer. The customized marketing message comprises a marketing message for the set of promoted items.

6 Claims, 11 Drawing Sheets

(56) References Cited

U.S. PATENT DOCUMENTS

| | | |
|---|---|---|
| 5,799,292 A | 8/1998 | Hekmatpour |
| 5,855,008 A | 12/1998 | Goldhaber et al. |
| 5,898,475 A | 4/1999 | Martin |
| 5,918,211 A | 6/1999 | Sloane |
| 5,933,811 A | 8/1999 | Angles et al. |
| 5,956,081 A | 9/1999 | Katz et al. |
| 6,009,410 A | 12/1999 | LeMole et al. |
| 6,028,626 A | 2/2000 | Aviv |
| 6,032,127 A | 2/2000 | Schkolnick et al. |
| 6,052,676 A | 4/2000 | Hekmatpour |
| 6,055,513 A | 4/2000 | Katz et al. |
| 6,101,486 A | 8/2000 | Roberts et al. |
| 6,115,709 A | 9/2000 | Gilmour et al. |
| 6,118,887 A | 9/2000 | Cosatto et al. |
| 6,128,663 A | 10/2000 | Thomas |
| 6,167,441 A | 12/2000 | Himmel |
| 6,191,692 B1 | 2/2001 | Stoltz et al. |
| 6,226,784 B1 | 5/2001 | Holmes et al. |
| 6,249,768 B1 | 6/2001 | Tulskie, Jr. et al. |
| 6,266,649 B1 | 7/2001 | Linden et al. |
| 6,334,109 B1 | 12/2001 | Kanevsky et al. |
| 6,366,298 B1 | 4/2002 | Haitsuka |
| 6,393,163 B1 | 5/2002 | Burt et al. |
| 6,400,276 B1 | 6/2002 | Clark |
| 6,507,366 B1 | 1/2003 | Lee |
| 6,560,639 B1 | 5/2003 | Dan et al. |
| 6,571,216 B1 | 5/2003 | Garg et al. |
| 6,571,279 B1 | 5/2003 | Herz et al. |
| 6,584,445 B2 | 6/2003 | Papageorge |
| 6,593,852 B2 | 7/2003 | Gutta et al. |
| 6,647,257 B2 | 11/2003 | Owensby |
| 6,647,269 B2 | 11/2003 | Hendrey et al. |
| 6,659,344 B2 | 12/2003 | Otto et al. |
| 6,738,532 B1 | 5/2004 | Oldroyd |
| 6,754,389 B1 | 6/2004 | Dimitrova et al. |
| 6,829,475 B1 | 12/2004 | Lee et al. |
| 6,856,249 B2 | 2/2005 | Strubbe et al. |
| 6,879,960 B2 | 4/2005 | Nascenzi et al. |
| 6,976,000 B1 | 12/2005 | Manganaris et al. |
| 7,010,501 B1 | 3/2006 | Roslak et al. |
| 7,028,018 B2 | 4/2006 | Kocher |
| 7,044,369 B2 | 5/2006 | Gantz |
| 7,080,778 B1 | 7/2006 | Kressin et al. |
| 7,168,618 B2 | 1/2007 | Schwartz |
| 7,195,157 B2 | 3/2007 | Swartz et al. |
| 7,200,266 B2 | 4/2007 | Ozer et al. |
| 7,224,852 B2 | 5/2007 | Lipton et al. |
| 7,310,442 B2 | 12/2007 | Monachino et al. |
| 7,357,316 B2 | 4/2008 | Heckel et al. |
| 7,370,004 B1 | 5/2008 | Patel et al. |
| 7,394,916 B2 | 7/2008 | Brodsky et al. |
| 7,472,080 B2 | 12/2008 | Goel |
| 7,480,395 B2 | 1/2009 | Parunak et al. |
| 7,548,874 B2 | 6/2009 | Kanevsky et al. |
| 7,606,728 B2 | 10/2009 | Sorensen |
| 7,630,986 B1 | 12/2009 | Herz et al. |
| 7,673,797 B2 | 3/2010 | Edwards |
| 7,687,744 B2 | 3/2010 | Walter et al. |
| 7,788,170 B2 | 8/2010 | Lilly et al. |
| 7,801,762 B2 | 9/2010 | Walker et al. |
| 7,826,923 B2 | 11/2010 | Walker et al. |
| 7,865,371 B2 | 1/2011 | Shen |
| 7,908,233 B2 | 3/2011 | Angell et al. |
| 7,908,237 B2 | 3/2011 | Angell et al. |
| 7,925,549 B2 | 4/2011 | Looney et al. |
| 7,933,797 B2 | 4/2011 | Sorensen |
| 7,975,917 B2 | 7/2011 | Clark et al. |
| 8,195,499 B2 | 6/2012 | Angell et al. |
| 2002/0091568 A1 | 7/2002 | Kraft et al. |
| 2002/0107741 A1 | 8/2002 | Stern et al. |
| 2002/0111852 A1 | 8/2002 | Levine |
| 2002/0116265 A1 | 8/2002 | Hernandez |
| 2002/0121547 A1 | 9/2002 | Wieth et al. |
| 2002/0143613 A1 | 10/2002 | Hong et al. |
| 2002/0161651 A1 | 10/2002 | Godsey et al. |
| 2002/0171736 A1 | 11/2002 | Gutta et al. |
| 2002/0178013 A1 | 11/2002 | Hoffman et al. |
| 2003/0107650 A1 | 6/2003 | Colmenarez et al. |
| 2003/0212580 A1 | 11/2003 | Shen |
| 2003/0217024 A1 | 11/2003 | Kocher |
| 2003/0228035 A1 | 12/2003 | Parunak et al. |
| 2003/0231769 A1 | 12/2003 | Bolle et al. |
| 2004/0078236 A1 | 4/2004 | Stoodley et al. |
| 2004/0111454 A1 | 6/2004 | Sorensen |
| 2004/0113933 A1 | 6/2004 | Guler |
| 2004/0120581 A1 | 6/2004 | Ozer et al. |
| 2004/0125125 A1 | 7/2004 | Levy |
| 2004/0143505 A1 | 7/2004 | Kovach |
| 2004/0151374 A1 | 8/2004 | Lipton et al. |
| 2004/0156530 A1 | 8/2004 | Brodsky et al. |
| 2004/0225627 A1 | 11/2004 | Botros et al. |
| 2005/0002561 A1 | 1/2005 | Monachino et al. |
| 2005/0012817 A1 | 1/2005 | Hampapur et al. |
| 2005/0185392 A1 | 8/2005 | Walter et al. |
| 2005/0187819 A1 | 8/2005 | Johnson |
| 2006/0032914 A1 | 2/2006 | Brewster et al. |
| 2006/0032915 A1 | 2/2006 | Schwartz |
| 2006/0074769 A1 | 4/2006 | Looney et al. |
| 2006/0089918 A1 | 4/2006 | Avanzi et al. |
| 2006/0116927 A1 | 6/2006 | Miller, III et al. |
| 2006/0200378 A1 | 9/2006 | Sorensen |
| 2006/0218057 A1 | 9/2006 | Fitzpatrick et al. |
| 2006/0251541 A1* | 11/2006 | Santandrea ............... 422/5 |
| 2007/0008408 A1 | 1/2007 | Zehavi |
| 2007/0050828 A1 | 3/2007 | Renzi et al. |
| 2007/0052536 A1 | 3/2007 | Hawkes et al. |
| 2007/0069014 A1 | 3/2007 | Heckel et al. |
| 2007/0078759 A1 | 4/2007 | Lilly et al. |
| 2007/0100649 A1 | 5/2007 | Walker et al. |
| 2007/0112713 A1 | 5/2007 | Seaman et al. |
| 2007/0244778 A1 | 10/2007 | Bailard |
| 2007/0282665 A1 | 12/2007 | Buehler et al. |
| 2007/0291118 A1 | 12/2007 | Shu et al. |
| 2007/0294706 A1 | 12/2007 | Neuhauser et al. |
| 2008/0004951 A1 | 1/2008 | Huang et al. |
| 2008/0010114 A1 | 1/2008 | Head |
| 2008/0033752 A1 | 2/2008 | Rodgers |
| 2008/0059282 A1 | 3/2008 | Vallier et al. |
| 2008/0059297 A1 | 3/2008 | Vallier et al. |
| 2008/0077493 A1 | 3/2008 | Geffert |
| 2008/0114633 A1 | 5/2008 | Wolf et al. |
| 2008/0147511 A1 | 6/2008 | Edwards |
| 2008/0215391 A1 | 9/2008 | Dowling et al. |
| 2008/0089107 A1 | 10/2008 | Angell et al. |
| 2008/0243626 A1 | 10/2008 | Stawar et al. |
| 2008/0249793 A1 | 10/2008 | Angell et al. |
| 2008/0249835 A1 | 10/2008 | Angell et al. |
| 2008/0249836 A1 | 10/2008 | Angell et al. |
| 2008/0249837 A1 | 10/2008 | Angell et al. |
| 2008/0249838 A1 | 10/2008 | Angell et al. |
| 2008/0249851 A1 | 10/2008 | Angell et al. |
| 2008/0249856 A1 | 10/2008 | Angell et al. |
| 2008/0249857 A1 | 10/2008 | Angell et al. |
| 2008/0249858 A1 | 10/2008 | Angell et al. |
| 2008/0249859 A1 | 10/2008 | Angell et al. |
| 2008/0249864 A1 | 10/2008 | Angell et al. |
| 2008/0249865 A1 | 10/2008 | Angell et al. |
| 2008/0249866 A1 | 10/2008 | Angell et al. |
| 2008/0249868 A1 | 10/2008 | Angell et al. |
| 2008/0249869 A1 | 10/2008 | Angell et al. |
| 2008/0249870 A1 | 10/2008 | Angell et al. |
| 2008/0270172 A1 | 10/2008 | Luff et al. |
| 2008/0270220 A1* | 10/2008 | Ramer et al. ............... 705/10 |
| 2008/0270222 A1 | 10/2008 | Goel |
| 2009/0002155 A1 | 1/2009 | Ma et al. |
| 2009/0005650 A1 | 1/2009 | Angell et al. |
| 2009/0006125 A1 | 1/2009 | Angell et al. |
| 2009/0006286 A1 | 1/2009 | Angell et al. |
| 2009/0006295 A1 | 1/2009 | Angell et al. |
| 2009/0037193 A1* | 2/2009 | Vempati et al. ............ 705/1 |
| 2009/0083121 A1 | 3/2009 | Angell et al. |
| 2009/0083122 A1 | 3/2009 | Angell et al. |
| 2009/0089107 A1 | 4/2009 | Angell et al. |
| 2009/0198625 A1* | 8/2009 | Walker et al. ............. 705/80 |

(56) References Cited

U.S. PATENT DOCUMENTS

| | | | |
|---|---|---|---|
| 2009/0322492 A1 | 12/2009 | Hannah et al. | |
| 2010/0023372 A1* | 1/2010 | Gonzalez | 705/10 |
| 2010/0026802 A1 | 2/2010 | Titus et al. | |
| 2010/0032482 A1* | 2/2010 | Clark et al. | 235/383 |
| 2010/0169229 A1 | 7/2010 | Lee | |
| 2010/0180029 A1 | 7/2010 | Fourman | |
| 2011/0004511 A1 | 1/2011 | Reich | |
| 2012/0328263 A1 | 12/2012 | Barton et al. | |
| 2013/0096966 A1 | 4/2013 | Barnes | |

FOREIGN PATENT DOCUMENTS

| | | | |
|---|---|---|---|
| JP | 2003263544 | A | 9/2003 |
| WO | 0217235 | A2 | 2/2002 |
| WO | 0217235 | A3 | 2/2002 |

OTHER PUBLICATIONS

U.S. Appl. No. 11/861,520, filed Sep. 26, 2007, Angell et al.
U.S. Appl. No. 11/861,590, filed Sep. 26, 2007, Angell et al.
U.S. Appl. No. 11/862,279, filed Sep. 27, 2007, Angell et al.
U.S. Appl. No. 11/862,294, filed Sep. 27, 2007, Angell et al.
U.S. Appl. No. 11/862,299, filed Sep. 27, 2007, Angell et al.
U.S. Appl. No. 11/862,306, filed Sep. 27, 2007, Angell et al.
U.S. Appl. No. 11/862,320, filed Sep. 27, 2007, Angell et al.
U.S. Appl. No. 11/862,323, filed Sep. 27, 2007, Angell et al.
U.S. Appl. No. 11/743,982, filed May 3, 2007, Angell et al.
U.S. Appl. No. 11/744,024, filed May 3, 2007, Angell et al.
U.S. Appl. No. 11/769,409, filed Jun. 27, 2007, Angell et al.
U.S. Appl. No. 11/756,198, filed May 31, 2007, Angell et al.
U.S. Appl. No. 11/771,252, filed Jun. 29, 2007, Angell et al.
U.S. Appl. No. 11/764,524, filed Jun. 18, 2007, Angell et al.
U.S. Appl. No. 11/861,528, filed Sep. 26, 2007, Angell et al.
U.S. Appl. No. 11/862,374, filed Sep. 27, 2007, Angell et al.
U.S. Appl. No. 11/771,887, filed Jun. 29, 2007, Angell et al.
U.S. Appl. No. 11/771,912, filed Jun. 29, 2007, Angell et al.
U.S. Appl. No. 11/861,966, filed Sep. 26, 2007, Angell et al.
U.S. Appl. No. 11/861,975, filed Sep. 26, 2007, Angell et al.
USPTO office action for U.S. Appl. No. 11/862,320 dated Aug. 5, 2010.
USPTO office action for U.S. Appl. No. 11/743,982 dated Aug. 19, 2010.
USPTO final office action for U.S. Appl. No. 11/756,198 dated Aug. 31, 2010.
USPTO office action for U.S. Appl. No. 11/862,374 dated Aug. 19, 2010.
USPTO final office action for U.S. Appl. No. 11/769,409 dated Aug. 31, 2010.
USPTO final office action for U.S. Appl. No. 11/771,912 dated Jul. 21, 2010.
USPTO final office action for U.S. Appl. No. 11/861,528 dated Sep. 9, 2010.
USPTO Notice of allowance for U.S. Appl. No. 11/771,887 dated Sep. 2, 2010.
Knuchel et al., "A Learning based approach for anonymous Recommendation", Proceedings of the 8th IEEE International Conference on E-Commerce Technology and the 3rd IEEE International Conference on Enterprise Computing, E-Commerce and E-Services, 2006, pp. 1-8.
USPTO office action for U.S. Appl. No. 11/695,983 dated Mar. 25, 2010.
USPTO office action for U.S. Appl. No. 11/861,520 dated May 6, 2010.
USPTO office action for U.S. Appl. No. 11/743,982 dated Mar. 24, 2010.
USPTO office action for U.S. Appl. No. 11/769,409 dated Apr. 14, 2010.
USPTO office action for U.S. Appl. No. 11/756,198 dated Apr. 22, 2010.
USPTO office action for U.S. Appl. No. 11/771,252 dated May 5, 2010.
USPTO office action for U.S. Appl. No. 11/764,524 dated Apr. 15, 2010.
USPTO office action for U.S. Appl. No. 11/861,528 dated May 13, 2010.
USPTO office action for U.S. Appl. No. 11/771,887 dated Mar. 8, 2010.
USPTO office action for U.S. Appl. No. 11/771,912 dated Apr. 8, 2010.
Wu et al. "Vehicle Sound Signature Recognition by Frequency Vector Principal Component Analysis", IEEE Instrumentation and Measurement Technology Conference, May 18-20, 1998, pp. 429-434.
Kosba, et al, "Personalized Hypermedia Presentation Techniques for Improving Online Customer Relationships", The Knowledge Engineering Review, Vo 16:2, 2001, pp. 111-155.
Ng, Cheuk-Fan, Satisfying shoppers psychological needs: From public market to cyber-mall, 2002, Journal of Environmental Psycology, 23 (2003) pp. 439-455.
USPTO office action for U.S. Appl. No. 11/861,590 dated Jun. 15, 2010.
USPTO office action for U.S. Appl. No. 11/862,306 dated Jun. 24, 2010.
Final Office Action regarding U.S. Appl. No. 11/862,374, dated Jan. 4, 2012, 36 pages.
Final Office Action regarding U.S. Appl. No. 11/771,252, dated Oct. 15, 2010, 20 pages.
Office Action regarding U.S. Appl. No. 11/771,884, dated Sep. 23, 2010, 15 pages.
Final Office Action regarding U.S. Appl. No. 11/771,884, dated Mar. 18, 2011, 13 pages.
Office Action regarding U.S. Appl. No. 11/771,884, dated Aug. 17, 2011, 14 pages.
Final Office Action regarding U.S. Appl. No. 11/771,884, dated Feb. 28, 2012, 17 pages.
Notice of Allowance regarding U.S. Appl. No. 11/771,912, dated Nov. 5, 2010, 12 pages.
Final Office Action regarding U.S. Appl. No. 11/695,983, dated Jul. 7, 2010, 23 pages.
Final Office Action regarding U.S. Appl. No. 11/861,520, dated Oct. 28, 2010, 26 pages.
Final Office Action regarding U.S. Appl. No. 11/861,590, dated Nov. 18, 2010, 31 pages.
Final Office Action regarding U.S. Appl. No. 11/861,966, dated Jul. 22, 2011, 21 pages.
Notice of Allowance regarding U.S. Appl. No. 11/861,975, dated Feb. 3, 2012, 14 pages.
Final Office Action regarding U.S. Appl. No. 11/862,279, dated Jul. 19, 2011, 20 pages.
Office Action regarding U.S. Appl. No. 11/862,294, dated May 13, 2010, 19 pages.
Office Action regarding U.S. Appl. No. 11/862,294, dated Nov. 1, 2010, 25 pages.
Final Office Action regarding U.S. Appl. No. 11/862,294, dated Apr. 14, 2011, 23 pages.
Office Action regarding U.S. Appl. No. 11/774,884, dated Sep. 4, 2012, 16 pages.
Office Action regarding U.S. Appl. No. 11/861,966, dated Oct. 4, 2012, 68 pages.
Final office action regarding U.S. Appl. No. 11/756,198, dated Apr. 24, 2014, 31 pages.
Notice of allowance regarding U.S. Appl. No. 11/771,252, dated Mar. 25, 2014, 21 pages.
Notice of allowance regarding U.S. Appl. No. 11/862,306, dated May 1, 2014, 28 pages.
Final office action regarding U.S. Appl. No. 11/862,323, dated Jun. 3, 2014, 27 pages.
Liraz, "Improving Your Sales Skills," Marketing Management, BizMove Busines Guides, Feb. 1, 2001, 9 pages.
Final Office Action, dated Dec. 30, 2013, regarding U.S. Appl. No. 11/862,279, 16 pages.
Final Office Action, dated Feb. 11, 2014, regarding U.S. Appl. No. 11/862,306, 27 pages.

(56) References Cited

OTHER PUBLICATIONS

Office Action, dated Dec. 3, 2013, regarding U.S. Appl. No. 11/862,320, 54 pages.
Office Action, dated Jan. 28, 2014, regarding U.S. Appl. No. 11/862,323, 25 pages.
Final Office Action, dated Jan. 17, 2014, regarding U.S. Appl. No. 11/695,983, 33 pages.
Notice of Allowance, dated Feb. 26, 2014, regarding U.S. Appl. No. 11/862,320, 8 pages.
Final Office Action, dated Feb. 26, 2014, regarding U.S. Appl. No. 11/771,252, 33 pages.
Non-final office action dated Sep. 26, 2013 regarding U.S. Appl. No. 11/756,198, 68 pages.
Non-final office action dated Sep. 18, 2013 regarding U.S. Appl. No. 11/771,252, 70 pages.
Non-final office action dated Jul. 18, 2013 regarding U.S. Appl. No. 11/862,279, 60 pages.
Non-final office action dated Aug. 19, 2013 regarding U.S. Appl. No. 11/862,323, 40 pages.
Non-final office action dated Oct. 15, 2013 regarding U.S. Appl. No. 11/862,306, 67 pages.
Notice of allowance dated Sep. 13, 2013 regarding U.S. Appl. No. 11/769,409, 39 pages.
Non-final office action dated Sep. 17, 2013 regarding U.S. Appl. No. 11/695,983, 76 pages.
Lyall, "What's the Buzz? Rowdy Teenagers Don't Want to Hear It," Barry Journal, The New York Times, Nov. 2005, 1 page.
Non-final office action dated Mar. 15, 2013 regarding U.S. Appl. No. 11/862,323, 23 pages.
Office Action regarding U.S. Appl. No. 11/771,860, dated Sep. 29, 2010, 15 pages.
Final Office Action regarding U.S. Appl. No. 11/771,860, dated Mar. 1, 2011, 13 pages.
Office Action regarding U.S. Appl. No. 11/771,860, dated Nov. 17, 2011, 14 pages.
Final Office Action regarding U.S. Appl. No. 11/771,860, dated May 24, 2012, 14 pages.
Final office action regarding U.S. Appl. No. 11/771,860, dated Mar. 28, 2013, 44 pages.
Office action dated Jun. 12, 2014, regarding U.S. Appl. No. 11/455,251, 7 pages.
Office action dated Oct. 23, 2014, regarding U.S. Appl. No. 11/455,251, 8 pages.
Office action dated Aug. 28, 2014, regarding U.S. Appl. No. 11/862,323, 32 pages.
"CRM Marketing Initiatives," In: The CRM Handbook: A Business Guide to Customer Relationship Management, Dyche (Ed.), Addison-Wesley Professional, Aug. 9, 2001, excerpt from http://academic.safaribooksonline.com/print?xmlid=0-201-73062-61ch02lev1sec3, downloaded Jan. 23, 2012, 13 pages.
"Inforgames Brings Sense of Touch to Web Sites with Immersion Technology," Immersion Corporation, May 22, 2000, 2 pages.
"Software Models," Excel Software, http://web.archive.org/web/19990203054425/excelsoftware.com/models.hml, Oct. 1996, 11 pages.
"Software Prototyping," University of Houston, Sep. 22, 2008, 32 pages.
Anupam et al., "Personalizing the Web Using Site Descriptions," Proceedings of the 10th International Workshop on Database and Expert Systems Applications, Florence, Italy, Sep. 1-3, 1999, 7 pages.
Bestavros, "Banking Industry Walks 'Tightrope' in Personalization of Web Services," Bank Systems & Technology, 37(1):54, Jan. 2000.
Collins et al., "A System for Video Surveillance and Monitoring," Technical Report CMU-RI-TR-00-12, Robotics Institute, Carnegie Mellon University, May 2000, 69 pages.
Greiffenhagen et al., "Design, Analysis, and Engineering of Video Monitoring Systems: An Approach and a Case Study," Proceedings of the IEEE, 89(10):1498-1517, Oct. 2001.

Hampapur et al., "Smart Video Surveillance—Exploring the Concept of Multiscale Spatiotemporal Tracking," IEEE Signal Processing Magazine, 22(2):38-51, Mar. 2005.
Jones, "What's Your 'Risk Score'?" In These Times, May 28, 2003, http://www.inthesetimes.org/article/586/whats_your_, accessed Feb. 12, 2011, 3 pages.
Kittle, "Pilfered Profits; Both Retailers and Consumers Take a Hit from Shoplifting," Telegraph—Herald, Dubuque, Iowa, Apr. 28, 2008, http://proquest.umi.com/pdqweb?index=2&did=634769861&SrchMode=2&sid=5&Fmt=3, accessed Jul. 29, 2010, 5 pages.
Knuchel et al., "A Learning-Based Hybrid Approach for Anonymous Recommendation," 8th International Conference on E-Commerce Technology and the 3rd IEEE International Conference on Enterprise Computing, E-Commerce, and E-Services, San Francisco, California, Jun. 26-29, 2006, 8 pages.
Kobsa et al., "Personalised Hypermedia Presentation Techniques for Improving Online Customer Relationships," The Knowledge Engineering Review, 16(2):111-155, 2001.
Kuhn, "Affinity Architecture: Towards a Model for Planning and Designing Comprehensively Personalised Web Applications," Journal of AGASI, pp. 60-63, Jul. 1999.
Lipton et al., "Critical Asset Protection, Perimeter Monitoring, and Threat Detection Using Automated Video Surveillance," Proceedings of the 36th Annual International Carnahan Conference on Security Technology, Dec. 2002, pp. 1-11.
Mitchell, "Computerizing Video Surveillance Techniques," IBM Technical Disclosure Bulletin, n5 10-92, Oct. 1, 1992, 1 page.
Ng, "Satisfying Shoppers' Psychological Needs: From Public Market to Cyber-Mall," Journal of Environmental Psychology, 23:439-455, 2003.
Sandler, "Tavern Camera Mandate Proposed: Milwaukee Alderman Hopes to Log Evidence of Misbehavior, Crime," Knight Ridder Tribune Business News, Washington, D.C., Oct. 4, 2006, http://proquest.umi.com/pdqweb?index=2&did=1139882851&SrchMode=2&sid=1&Fmt=, accessed Aug. 12, 2011, 2 pages.
Wu et al., "Vehicle Sound Signature Recognition by Frequency Vector Principal Component Analysis," IEEE Instrumentation and Measurement Technology Conference, St. Paul, Minnesota, pp. 429-434, May 18-20, 1998.
Office Action regarding U.S. Appl. No. 09/761,121, dated Mar. 3, 2004, 9 pages.
Final Office Action regarding U.S. Appl. No. 09/761,121, dated Nov. 24, 2004, 6 pages.
Office Action regarding U.S. Appl. No. 09/761,121, dated May 24, 2005, 8 pages.
Final Office Action regarding U.S. Appl. No. 09/761,121, dated Nov. 16, 2005, 8 pages.
Office Action regarding U.S. Appl. No. 09/761,121, dated Jun. 10, 2010, 10 pages.
Final Office Action regarding U.S. Appl. No. 09/761,121, dated Oct. 25, 2010, 8 pages.
Notice of Allowance regarding U.S. Appl. No. 10/918,521, dated Sep. 27, 2006, 11 pages.
Office Action regarding U.S. Appl. No. 11/455,251, dated Dec. 10, 2010, 7 pages.
Final Office Action regarding U.S. Appl. No. 11/455,251, dated Apr. 27, 2011, 5 pages.
Office Action regarding U.S. Appl. No. 11/744,024, dated Sep. 28, 2010, 37 pages.
Final Office Action regarding U.S. Appl. No. 11/764,524, dated Aug. 19, 2010, 25 pages.
Final Office Action regarding U.S. Appl. No. 11/743,982, dated Jan. 31, 2011, 14 pages.
Final Office Action regarding U.S. Appl. No. 11/862,299, dated Aug. 18, 2011, 25 pages.
Final Office Action regarding U.S. Appl. No. 11/862,306, dated Dec. 3, 2010, 26 pages.
Office Action regarding U.S. Appl. No. 11/862,323, dated Sep. 3, 2010, 26 pages.
Final Office Action regarding U.S. Appl. No. 11/862,323, dated Aug. 19, 2011, 21 pages.

(56) References Cited

OTHER PUBLICATIONS

Office Action regarding U.S. Appl. No. 11/756,198, dated Apr. 22, 2010, 19 pages.
Final Office Action regarding U.S. Appl. No. 11/756,198, dated Aug. 31, 2010, 21 pages.
Final Office Action regarding U.S. Appl. No. 11/862,374, dated Jan. 28, 2011, 34 pages.
Final Office Action regarding U.S. Appl. No. 11/862,374, dated May 12, 2011, 31 pages.
Office Action regarding U.S. Appl. No. 11/862,374, dated Aug. 31, 2011, 37 pages.
Final office action dated Nov. 20, 2014, regarding U.S. Appl. No. 11/862,323, 10 pages.
Notice of Allowance dated Dec. 11, 2014, regarding U.S. Appl. No. 11/743,982, 41 pages.

* cited by examiner

| SELECTED ITEM 1302 | CORRELATED ITEMS 1304 |
|---|---|
| 1306 — PEANUT BUTTER | JELLY; BREAD |
| 1308 — CEREAL | MILK |
| CHOCOLATE MILK MIX | MILK |
| BREAD | BUTTER |
| 1310 — SPAGHETTI PASTA | SPAGHETTI SAUCE |
| SPAGHETTI SAUCE | SPAGHETTI PASTA |
| 1312 — WINE | CHEESE |
| CHIP DIP | CHIPS |
| HOT DOG BUNS | HOT DOGS |
| 1314 — PIZZA SAUCE | PIZZA CRUST; PIZZA CHEESE |
| HOT FUDGE | ICE CREAM |

*FIG. 13*

| SELECTED ITEM 1402 | UPSALE ITEMS 1404 |
|---|---|
| 1406 — 6 PACK ROOT BEER | 12 PACK ROOT BEER; 24 PACK ROOT BEER; 2 LITER ROOT BEER; 2 LITER ROOT BEER AND ICE CREAM |
| 1408 — 60 COUNT VITAMINS | 100 COUNT VITAMINS |
| 1410 — BRAND X PIZZA | BRAND Y PIZZA |

*FIG. 14*

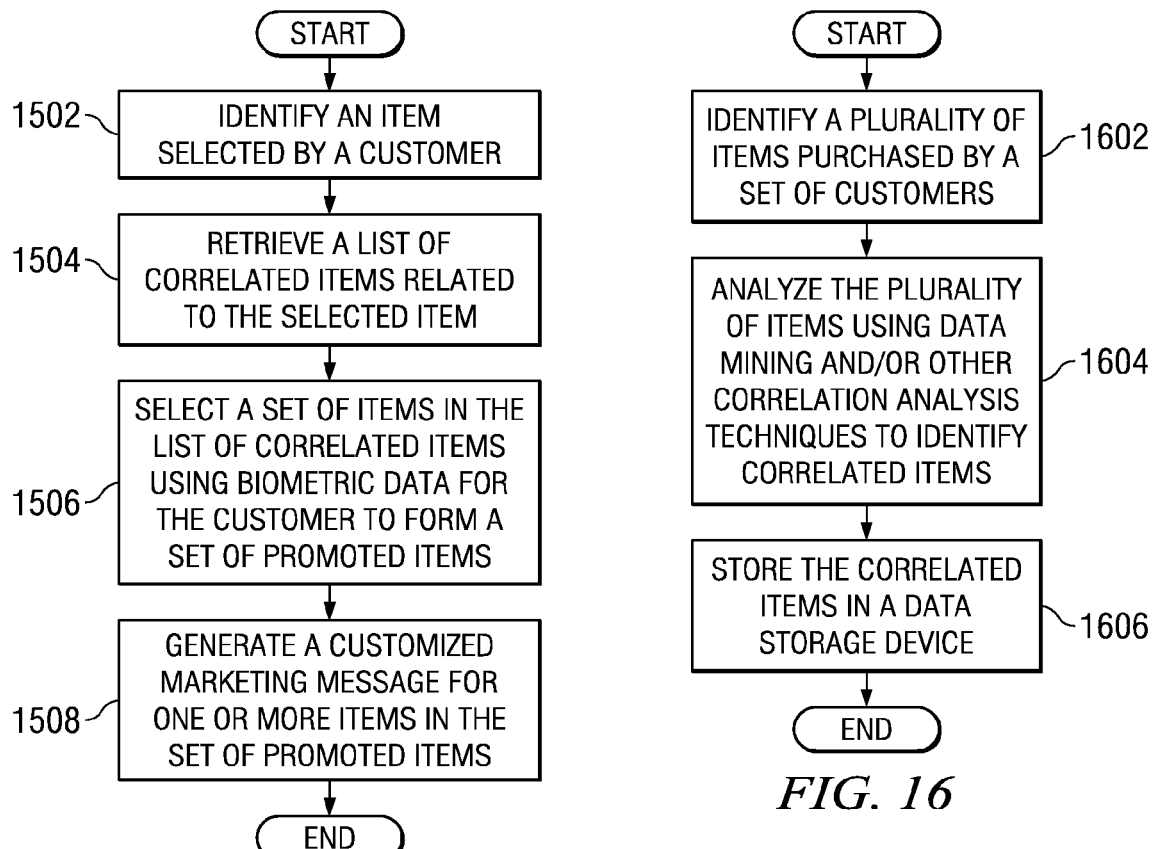
FIG. 15
FIG. 16
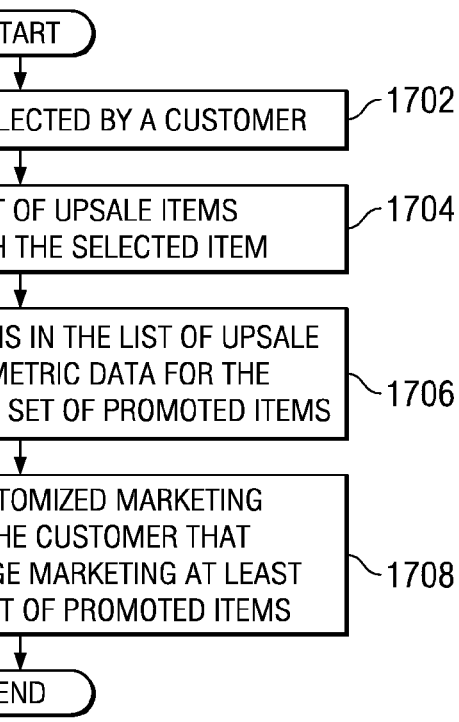
FIG. 17

USING BIOMETRIC DATA FOR A CUSTOMER TO IMPROVE UPSALE AD CROSS-SALE OF ITEMS

CROSS-REFERENCE TO RELATED APPLICATIONS

This application is a continuation-in-part of patent application U.S. Ser. No. 11/695,983, filed Apr. 3, 2007, titled "Method and Apparatus for Providing Customized Digital Media Marketing Content Directly to a Customer", which is incorporated herein by reference.

The present invention is also related to the following applications entitled Identifying Significant Groupings of Customers for Use in Customizing Digital Media Marketing Content Provided Directly to a Customer, application Ser. No. 11/744,024, filed May 3, 2007; Generating Customized Marketing Messages at a Customer Level Using Current Events Data, application Ser. No. 11/769,409, file Jun. 24, 2007; Generating Customized Marketing Messages Using Automatically Generated Customer Identification Data, application Ser. No. 11/756,198, filed May 31, 2007; Generating Customized Marketing Messages for a Customer Using Dynamic Customer Behavior Data, application Ser. No. 11/771,252, filed Jun. 29, 2007, Retail Store Method and System, Robyn Schwartz, Publication No. US 2006/0032915 A1 (filed Aug. 12, 2004); Business Offering Content Delivery, Robyn R. Levine, Publication No. US 2002/0111852 (filed Jan. 16, 2001) all assigned to a common assignee, and all of which are incorporated herein by reference.

BACKGROUND OF THE INVENTION

1. Field of the Invention

The present invention is related generally to an improved data processing system and in particular to a method and apparatus for processing video and audio data. More particularly, the present invention is directed to a computer implemented method, apparatus, and computer usable program code for using biometric data for a customer to generate customized marketing messages promoting upsales and cross-sales of items.

2. Description of the Related Art

When a customer shows interest in purchasing a particular item, merchants frequently attempt to induce the customer to purchase a more expensive brand of the item, an upgraded version of the item, a larger and more expensive size of the item, and/or other additions and special features for the item to make the sale more profitable. These sales techniques are sometimes referred to as upselling or upsale. For example, if a user is interested in purchasing a used car, the salesman may attempt to induce the customer into purchasing a more expensive new car instead. If the salesman is successful, the upsale of the more expensive car will likely generate greater profit and/or greater revenue.

Another sales technique involves selling related products to customers to increase profit and/or revenue. For example, if a customer shows interest in purchasing a bicycle, the salesman may attempt to induce the customer into purchasing a bicycle helmet, a bicycle tire pump, a spare tire, an extra bicycle chain, and/or other items that might be used in conjunction with the bicycle. This sales technique is referred to as cross-selling.

In the past, merchants, such as store owners and operators, frequently had a personal relationship with their customers. The merchant often knew their customers' names, address, marital status, ages of their children, hobbies, place of employment, anniversaries, birthdays, likes, dislikes and personal preferences. The merchant was able to use this information to cater to customer needs and push upsales and cross-sales of items the customer might be likely to purchase based on the customer's personal situation and the merchant's personal knowledge of purchases by his customers.

However, with the continued growth of large cities, the corresponding disappearance of small, rural towns, and the increasing number of large, impersonal chain stores with multiple employees, the merchants and employees of retail businesses rarely recognize regular customers, and almost never know the customer's name or any other details regarding their customer's personal preferences that might assist the merchant or employee in marketing efforts directed toward a particular customer.

One solution to this problem is directed toward using profile data for a customer to generate marketing messages that may be sent to the customer by email, print media, telephone, or over the World Wide Web via a web page. Customer profile data typically includes information provided by the customer in response to a questionnaire or survey, such as name, address, telephone number, gender, and indicators of particular products the customer is interested in purchasing. Demographic data regarding a customer's age, sex, income, career, interests, hobbies, and consumer preferences may also be included in customer profile data.

Advertising computers can generate a customer advertisement based on the customer's static profile. However, this method only provides a small number of pre-generated advertisements that are directed towards a fairly large segment of the population rather than to one individual.

In another solution, user profile data, demographic data, point of contact data, and transaction data are analyzed to generate advertising content for customers that target the information content presented to individual consumers or users to increase the likelihood that the customer will purchase the goods or services presented. Current solutions do not utilize all of the potential customer data elements that may be available to a retail owner or operator for generating customized marketing messages targeted to individual customers. Other data pieces are needed to provide effective dynamic one-to-one marketing of messages to the potential customer. Therefore, the data elements in prior art only provides approximately seventy-five percent (75%) of the needed data.

SUMMARY OF THE INVENTION

The illustrative embodiments provide a computer implemented method, apparatus, and computer usable program code for generating customized marketing messages to increase purchases by a customer. In one embodiment, an item selected by the customer is identified to form a selected item. Biometric readings for the customer are received from a set of biometric devices associated with a retail facility to form the biometric data. The biometric data is data regarding a set of physiological responses of the customer. A set of items is selected from a list of items associated with the selected item using the biometric data for the customer to form a set of promoted items. A customized marketing message for the customer is generated using a set of personalized marketing message criteria for the customer. The customized marketing message comprises a marketing message promoting a sale of the set of promoted items.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 13 is a block diagram illustrating a list of correlated items for promoting cross sales of related items in accordance with an illustrative embodiment;

FIG. 14 is a block diagram illustrating a list of upsale items corresponding to selected items in accordance with an illustrative embodiment;

FIG. 15 is a flowchart illustrating a process for generating a customized marketing message for promoting cross sales of items related to an item selected by a customer in accordance with an illustrative embodiment;

FIG. 16 is a flowchart illustrating a process for generating a list of items purchased in correlation with a selected item in accordance with an illustrative embodiment;

FIG. 17 is a flowchart illustrating a process for generating a customized marketing message for promoting upsales of items in accordance with an illustrative embodiment;

DETAILED DESCRIPTION OF THE PREFERRED EMBODIMENT

With reference now to the figures and in particular with reference to FIGS. 1-5, exemplary diagrams of data processing environments are provided in which illustrative embodiments may be implemented. It should be appreciated that FIGS. 1-5 are only exemplary and are not intended to assert or imply any limitation with regard to the environments in which different embodiments may be implemented. Many modifications to the depicted environments may be made.

Figure 1:
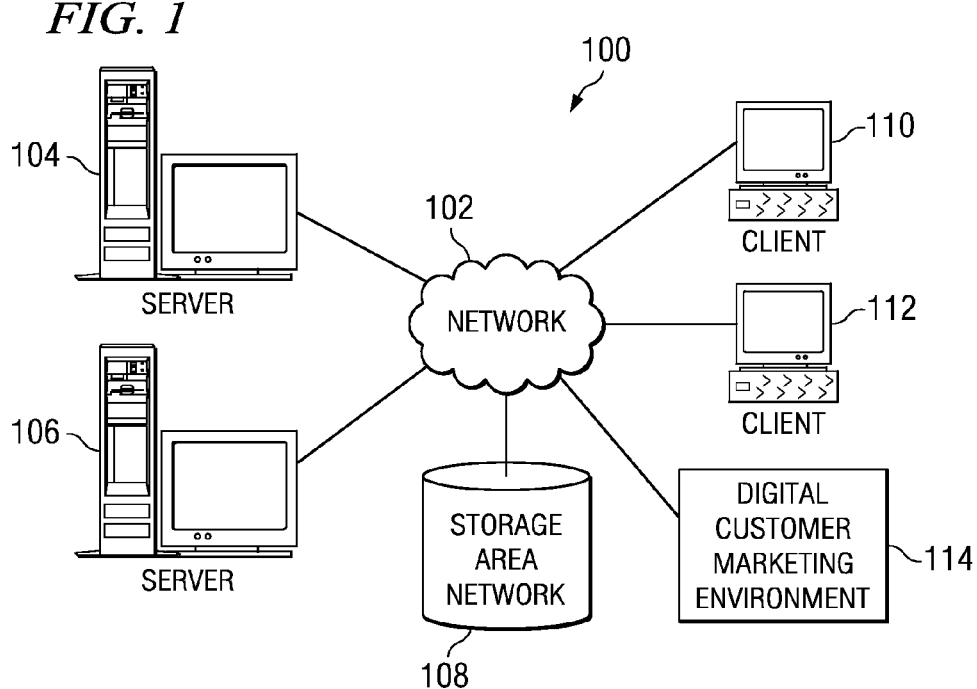
FIG. 1 is a pictorial representation of a network of data processing systems in which illustrative embodiments may be implemented.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage area network (SAN) 108. Storage area network 108 is a network connecting one or more data storage devices to one or more servers, such as servers 104 and 106. A data storage device, may include, but is not limited to, tape libraries, disk array controllers, tape drives, flash memory, a hard disk, and/or any other type of storage device for storing data. Storage area network 108 allows a computing device, such as client 110 to connect to a remote data storage device over a network for block level input/output.

In addition, clients 110 and 112 connect to network 102. These clients 110 and 112 may be, for example, personal computers or network computers. In the depicted example, server 104 provides data, such as boot files, operating system images, and applications to clients 110 and 112. Clients 110 and 112 are clients to server 104 in this example.

Digital customer marketing environment 114 also connects to network 102. Digital customer marketing environment 114 is a marketing environment in which a customer may view, select order, and/or purchase one or more items. Digital customer marketing environment 114 may include one or more facilities, buildings, or other structures for wholly or partially containing the items. A facility may include, but is not limited to, a grocery store, a clothing store, a marketplace, a retail department store, a convention center, or any other type of structure for housing, storing, displaying, and/or selling items.

Items in digital customer marketing environment 114 may include, but are not limited to, comestibles, clothing, shoes, toys, cleaning products, household items, machines, any type of manufactured items, entertainment and/or educational materials, as well as entrance or admittance to attend or receive an educational or entertainment service, activity, or event. Items for purchase could also include services, such as ordering dry cleaning services, food delivery, or any other services.

Comestibles include solid, liquid, and/or semi-solid food and beverage items. Comestibles may be, but are not limited to, meat products, dairy products, fruits, vegetables, bread, pasta, pre-prepared or ready-to-eat items, as well as unprepared or uncooked food and/or beverage items. For example, a comestible could include, without limitation, a box of cereal, a steak, tea bags, a cup of tea that is ready to drink, popcorn, pizza, candy, or any other edible food or beverage items.

An entertainment or educational activity, event, or service may include, but is not limited to, a sporting event, a music concert, a seminar, a convention, a movie, a ride, a game, a theatrical performance, and/or any other performance, show, or spectacle for entertainment or education of customers. For example, entertainment or educational activity or event could include, without limitation, the purchase of seating at a football game, purchase of a ride on a roller coaster, purchase of a manicure, or purchase of admission to view a film.

Digital customer marketing environment 114 may also includes a parking facility for parking cars, trucks, motorcycles, bicycles, or other vehicles for conveying customers to and from digital customer marketing environment 114. A parking facility may include an open air parking lot, an underground parking garage, an above ground parking garage, an automated parking garage, and/or any other area designated for parking customer vehicles.

For example, digital customer marketing environment 114 may be, but is not limited to, a grocery store, a retail store, a department store, an indoor mall, an outdoor mall, a combination of indoor and outdoor retail areas, a farmer's market, a convention center, a sports arena or stadium, an airport, a bus depot, a train station, a marina, a hotel, fair grounds, an amusement park, a water park, and/or a zoo.

Digital customer marketing environment 114 encompasses a range or area in which marketing messages may be transmitted to a digital display device for presentation to a customer within digital customer marketing environment. Digital multimedia management software is used to manage and/or enable generation, management, transmission, and/or display of marketing messages within digital customer marketing environment. Examples of digital multimedia management software include, but are not limited to, Scala® digital media/digital signage software, EK3® digital media/digital signage software, and/or Allure digital media software.

In this example, digital customer marketing environment 114 is connected to server 104 and server 106 via network 102. In another embodiment, digital customer marketing environment 114 includes one or more servers located on-site at digital customer marketing environment. In this example, network 102 is optional. In other words, if one or more servers and/or data processing systems are located at digital customer marketing environment 114, the illustrative embodiments are capable of being implemented without a network connection.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as, without limitation, an intranet, an Ethernet, a local area network (LAN), and/or a wide area network (WAN).

Network data processing system 100 may also include additional data storage devices, such as, without limitation, a hard disk, a compact disk (CD), a compact disk rewritable (CD-RW), a flash memory, a compact disk read-only memory (CD ROM), a non-volatile random access memory (NVRAM), and/or any other type of storage device for storing data FIG. 1 is intended as an example, and not as an architectural limitation for different embodiments. Network data processing system 100 may include additional servers, clients, data storage devices, and/or other devices not shown. For example, server 104 may also include devices not depicted in FIG. 1, such as, without limitation, a local data storage device. A local data storage device could include a hard disk, a flash memory, a non-volatile random access memory (NVRAM), a read only memory (ROM), and/or any other type of device for storing data.

A merchant, owner, operator, manager or other employee associated with digital customer marketing environment 114 typically wants to market upsale items or related cross-sale products or services to a customer or potential customer in the most convenient and efficient manner possible so as to maximize resulting purchases of goods and/or services by the customer and increase revenue. Therefore, the aspects of the illustrative embodiments recognize that it is advantageous for the merchant to have as much information regarding a customer as possible to identify which items are most likely or expected to be purchased by the customer, and therefore, the best candidates for marketing to the customer and personalize the merchant's marketing strategy to that particular customer.

In addition, customers generally prefer to only receive marketing messages that are relevant to that particular customer. For example, a single college student with no children would typically not be interested in marketing messages offering sale prices or incentives for purchasing baby diapers or children's toys. In addition, that college student would not want to waste their time viewing such marketing messages. Likewise, a customer that is a non-smoker may be inconvenienced by being presented with advertisements, email, digital messages, or other marketing messages for tobacco products.

Therefore, the illustrative embodiments provide a computer implemented method, apparatus, and computer usable program code for generating customized marketing messages to increase purchases by a customer. In one embodiment, an item selected by the customer is identified to form a selected item. Biometric readings for the customer are received from a set of biometric devices associated with a retail facility to form the biometric data. As used herein, the term "set" includes one or more.

The biometric data is data regarding a set of physiological responses of the customer. A set of items is selected from a list of items associated with the selected item using the biometric data for the customer to form a set of promoted items. A set of promoted items includes a single promoted item, as well as two or more promoted items. A customized marketing message for the customer is generated using a set of personalized marketing message criteria for the customer. The customized marketing message comprises a marketing message for the set of promoted items.

In one embodiment, the list of items associated with the selected items is a list of upsale items. An upsale item in the set of promoted items is an item that provides a same basic functionality as the selected item. In this example, the customized marketing message prompts the customer to purchase the upsale item instead of the selected item because a sale of the upsale item to the customer produces a greater amount of revenue or a greater amount of profit than a sale of the selected item.

In another embodiment, the list of items associated with the selected items is a list of correlated items. A correlated item provides a different basic functionality than the selected item. The process identifies a set of items in a list of correlated items to form the set of promoted items. The customized marketing message prompts the customer to purchase the correlated item in the set of promoted items in addition to the selected item.

The customized marketing message is a marketing message that is generated for a particular customer or group of customers based on one or more personalized message criteria for the customer. In other words, the customized marketing message is a highly personalized marketing message for a specific or particular customer. The personalized marketing message may include special offers or incentives to a particular customer. An incentive is an offer of a discount or reward to encourage a customer to select, order, and/or purchase one or more items.

The customized marketing message is more than just a marketing message that includes the customer's name or address. The customized marketing message presents a marketing message pushing the sale of an item that is selected and generated dynamically in real-time as the customer is shopping in the store.

Figure 2:
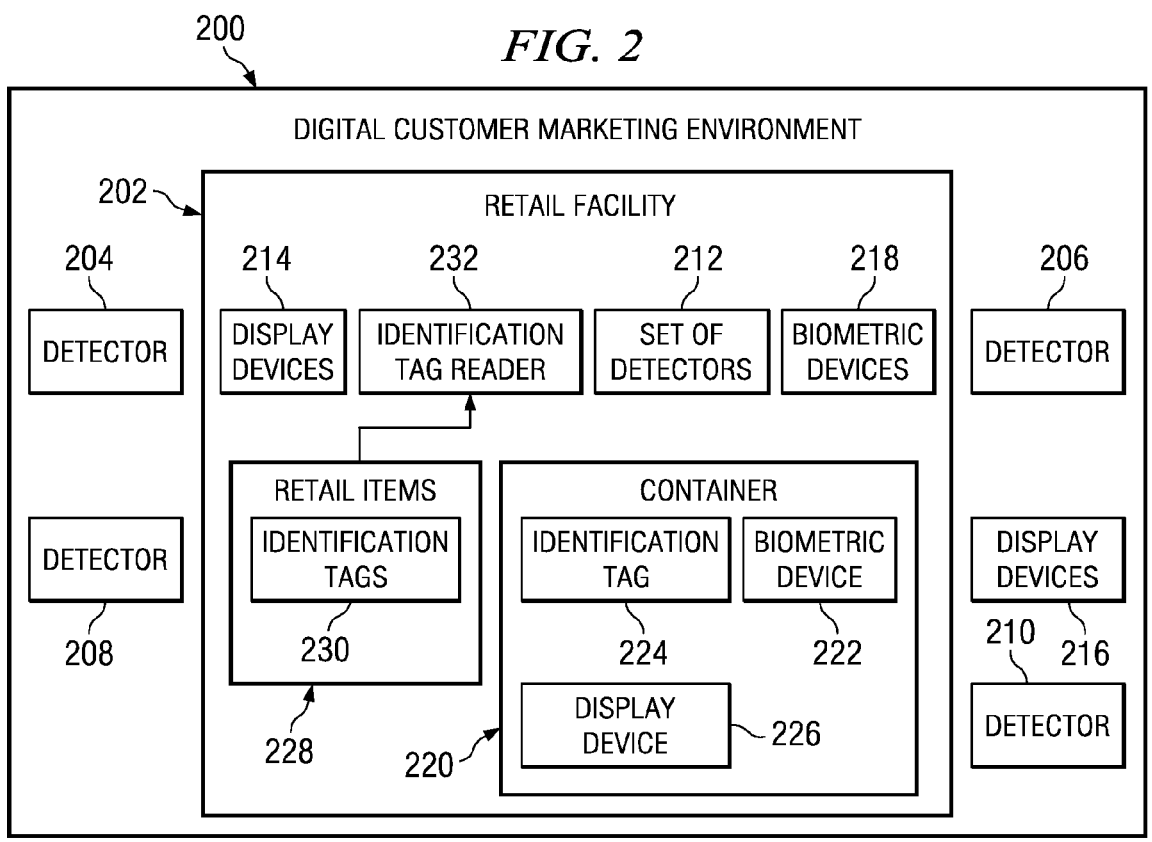
FIG. 2 is a block diagram of a digital customer marketing environment in which illustrative embodiments may be implemented.

FIG. 2 is a block diagram of a digital customer marketing environment in which illustrative embodiments may be implemented. Digital customer marketing environment 200 is a marketing environment, such as digital customer marketing environment 114 in FIG. 1.

Retail facility 202 is a retail facility for wholly or partially storing, enclosing, or displaying items for marketing, viewing, selection, order, and/or purchase by a customer. For example, retail facility 202 may be, without limitation, a retail store, supermarket, book store, clothing store, or shopping mall. However, retail facility 202 is not limited to retail stores. For example, retail facility 202 may also include, without limitation, a sports arena, amusement park, water park, convention center, trade center, or any other facility for offering, providing, or displaying items for sale. In this example, retail facility 202 is a grocery store or a department store.

Detectors 204-210 are devices for gathering data associated with a set of customers. A set of customers is a set of one or more customers. Detectors 204-210 are examples of detectors that are located externally to retail facility 202. In this example, detectors 204-210 are located at locations along an outer perimeter of digital customer marketing environment 200. However, detectors 204-210 may be located at any position within digital customer marketing environment 200 that is outside retail facility 202 to detect customers before the customers enter retail facility 202 and/or after customers leave digital customer marketing environment 200.

Detectors 204-210 may be any type of detecting devices for gathering dynamic data associated with a customer located outside of retail facility 202, including, but not limited to, a camera, a set of one or more motion sensor devices, a sonar, microphone, sound recording device, audio detection device, a voice recognition system, a heat sensor, a seismograph, a pressure sensor, a device for detecting odors, scents, and/or fragrances, a radio frequency identification (RFID) tag reader, a global positioning system (GPS) receiver, and/or any other detection device for detecting a presence of a human, animal, and/or vehicle outside of the retail facility. A vehicle is any type of vehicle for conveying people, animals, or objects to a destination. A vehicle may include, but is not limited to, a car, bus, truck, motorcycle, boat, airplane, or any other type of vehicle.

A heat sensor is any known or available device for detecting heat, such as, but not limited to, a thermal imaging device for generating images showing thermal heat patterns. A heat sensor can detect body heat generated by a human or animal and/or heat generated by a vehicle, such as an automobile or a motorcycle. A set of heat sensors may include one or more heat sensors.

A motion detector may include any type of known or available motion detector device. A motion detector device may include, but is not limited to, a motion detector device using a photo-sensor, radar or microwave radio detector, or ultrasonic sound waves.

A motion detector using ultrasonic sound waves transmits or emits ultrasonic sound waves. The motion detector detects or measures the ultrasonic sound waves that are reflected back to the motion detector. If a human, animal, or other object moves within the range of the ultrasonic sound waves generated by the motion detector, the motion detector detects a change in the echo of sound waves reflected back. This change in the echo indicates the presence of a human, animal, or other object moving within the range of the motion detector.

In one example, a motion detector device using a radar or microwave radio detector may detect motion by sending out a burst of microwave radio energy and detecting the same microwave radio waves when the radio waves are deflected back to the motion detector. If a human, animal, or other object moves into the range of the microwave radio energy field generated by the motion detector, the amount of energy reflected back to the motion detector is changed. The motion detector identifies this change in reflected energy as an indication of the presence of a human, animal, or other object moving within the motion detectors range.

A motion detector device, using a photo-sensor, detects motion by sending a beam of light across a space into a photo-sensor. The photo-sensor detects when a human, animal, or object breaks or interrupts the beam of light as the human, animal, or object by moving in-between the source of the beam of light and the photo-sensor. These examples of motion detectors are presented for illustrative purposes only. A motion detector in accordance with the illustrative embodiments may include any type of known or available motion detector and is not limited to the motion detectors described herein.

A pressure sensor detector may be, for example, a device for detecting a change in weight or mass associated with the pressure sensor. For example, if one or more pressure sensors are imbedded in a sidewalk, Astroturf, or floor mat, the pressure sensor detects a change in weight or mass when a human customer or animal steps on the pressure sensor. The pressure sensor may also detect when a human customer or animal steps off of the pressure sensor. In another example, one or more pressure sensors are embedded in a parking lot, and the pressure sensors detect a weight and/or mass associated with a vehicle when the vehicle is in contact with the pressure sensor. A vehicle may be in contact with one or more pressure sensors when the vehicle is driving over one or more pressure sensors and/or when a vehicle is parked on top of one or more pressure sensors.

A camera may be any type of known or available camera, including, but not limited to, a video camera for taking moving video images, a digital camera capable of taking still pictures and/or a continuous video stream, a stereo camera, a web camera, and/or any other imaging device capable of capturing a view of whatever appears within the camera's range for remote monitoring, viewing, or recording of a distant or obscured person, object, or area.

Various lenses, filters, and other optical devices such as zoom lenses, wide angle lenses, mirrors, prisms and the like may also be used with an image capture device to assist in capturing the desired view. The image capture device may be fixed in a particular orientation and configuration, or it may, along with any optical devices, be programmable in orientation, light sensitivity level, focus or other parameters. Programming data may be provided via a computing device, such as server 104 in FIG. 1.

An image capture device may be, without limitation, one or more cameras. A camera may also be a stationary camera and/or non-stationary cameras. A non-stationary camera is a camera that is capable of moving and/or rotating along one or more directions, such as up, down, left, right, and/or rotate about an axis of rotation. The camera may also be capable of moving to follow or track a person, animal, or object in motion. In other words, the camera may be capable of moving about an axis of rotation in order to keep a customer, animal, or object within a viewing range of the camera lens. In this example, detectors 204-210 are non-stationary digital video cameras.

Detectors 204-210 are connected to an analysis server on a data processing system, such as network data processing system 100 in FIG. 1. The analysis server is illustrated and described in greater detail in FIG. 6 below. The analysis server includes software for analyzing digital images and other data captured by detectors 204-210 to track and/or visually identify retail items, containers, and/or customers outside retail facility 202. Attachment of identifying marks may be part of this visual identification in the illustrative embodiments.

The analysis server analyzes and/or processes the data captured by detectors 204-210 to form dynamic data. Dynamic data is data associated with a customer that is generated in real-time as a customer is shopping at a retail facility. Real-time refers to something that occurs immediately as or within some period of time needed to achieve an objective.

As used herein, data associated with a customer may include data regarding the customer, members of the customer's family, pets, cars or other vehicles, the customer's shopping companions, the customer's friends, and/or any other data pertaining to the customer. The customized marketing message is delivered to a display device associated with the customer for display.

Dynamic data is data for a customer that is gathered and processed in real time as a customer is shopping or browsing in digital customer marketing environment 114. Processing dynamic data may include, but is not limited to, formatting the dynamic data for utilization and/or analysis in one or more data models, combining the dynamic data with external data and/or static customer data, comparing the dynamic data to a data model and/or filtering the dynamic data for relevant data elements.

Dynamic data is processed or filtered for analysis in a set of one or more data models. For example, if the dynamic data includes video images of a customer inside a retail facility, the video images may need to be processed to convert the video images into data and/or metadata for analysis in one or more data models. For example, a data model may not be capable of analyzing raw, or unprocessed video images captured by a camera. The video images may need to be processed into data and/or meta data describing the contents of the video images before a data model may be used to organize, structure, or otherwise manipulate data and/or metadata. The video images converted to data and/or meta data that is ready for processing or analysis in a set of data models is an example of processed dynamic data.

The dynamic data is analyzed using a set of data models to identify and create specific and personalized marketing message criteria for the customer. A set of data models includes one or more data models. A data model is a model for structuring, defining, organizing, imposing limitations or constraints, and/or otherwise manipulating data and metadata to produce a result. A data model may be generated using any type of modeling method or simulation including, but not limited to, a statistical method, a data mining method, a causal model, a mathematical model, a marketing model, a behavioral model, a psychological model, a sociological model, or a simulation model.

The dynamic data may be analyzed in a single data model or in a series of data models. For example, and without limitation, a first data model in a series of data models is used to analyze the dynamic data. The output results of analyzing the dynamic data in the first data model is entered into a second data model as input. The output of the second data model is then entered into a third data model as input for analysis. This process can continue until the dynamic data has been analyzed in any number of data models in the set of data models. In another example, the dynamic data is analyzed in parallel in two or more data models in the set of data models. The results output by the two or more data models are used to generate the customized marketing message and/or identify upsale and/or cross-sale items to be marketed to the customer.

In the embodiments described herein, dynamic data includes, but is not limited to, external data, grouping data, current events data, identification data, and/or customer behavior data. Thus, dynamic data can be only external data, external data and grouping data, external data, grouping data, current events data, identification data, and/or customer behavior data, or any other combination of these types of dynamic data.

External data is data regarding detection of a customer's presence outside a retail facility, a detection of a customer outside the retail facility that is moving toward an entrance to the retail facility indicating that the customer is about to go inside the facility, and/or detection of a customer exiting the retail facility. The external data may also indicate detection of a presence of a customer's vehicle, such as a car, bicycle, motorcycle, bus, or truck. External data may also include, without limitation, grouping data, identification data, and/or customer behavior data.

The external data is gathered by detectors 204-210. Thus, the external data includes, without limitation, video images, sound recorded by a microphone or other sound recording device, pressure sensor data gathered by one or more pressure sensors, data received from heat sensors, radio frequency identification tag signals recognized by a radio frequency identification tag reader, and/or any other type of detection data.

In this example, four detectors, detectors 204-210, are located outside retail facility 202. However, any number of detectors may be used to detect, track, and/or gather dynamic data associated with customers outside retail facility 202. For example, a single detector, as well as two or more detectors may be used outside retail facility 202 for tracking customers entering and/or exiting retail facility 202.

Retail facility 202 may also optionally include set of detectors 212 inside retail facility 202. Set of detectors 212 is a set of one or more detectors, such as detectors 204-210, for gathering dynamic data inside retail facility 202. The dynamic data gathered by set of detectors 212 includes, without limitation, grouping data, identification data, and/or customer behavior data.

Grouping data is data regarding a grouping category for a customer. A grouping category describes the relationship of a group or subset of customers. A grouping category includes, without limitation, parents with children, teenagers, children, minors unaccompanied by adults, minors accompanied by adults, grandparents with grandchildren, senior citizens, couples, friends, coworkers, a customer shopping alone, a customer accompanied by one or more pets, such as a dog, or any other category for a customer.

Grouping data is generated using either external data or detection data gathered inside a retail facility. Detection data gathered inside the retail facility includes, but is not limited to, video images of a customer captured by cameras located inside or internally to a retail facility and/or data regarding the current or real-time contents of a customer's shopping basket gathered by a set of radio frequency identification sensors located inside the retail facility.

Identification data is data identifying a customer or a customer's vehicle. Identification data may be generated by using facial recognition technology to analyze camera images and identify customers. Video images of a customer's car may also be analyzed to identify the car's license plate, make, model, year, color, and/or other attributes of the vehicle which may be used to identify the vehicle. The identification of the vehicle can then be used to identify the customer that owns and/or drives the vehicle. Identification data is generated using either external data gathered outside the retail facility or detection data gathered inside the retail facility.

Current events data is data describing events, news items, holidays, event days when an event is scheduled to take place, and competitor marketing data. An event may be any type of event, including, without limitation, parades, sports events, conventions, shows, theater and movie show times, concerts, opera performances, and circus performances. An event may also be a holiday or other significant date. Holidays may be days like Christmas, Thanksgiving, Earth Day, Memorial Day, Easter, Election Day, or any other day. A significant date may include, without limitation, the customer's birthday, anniversary, children's birthdays, birthdays and anniversary of family and friends, the first day of school, the first day of summer vacation, or any other significant dates. Competitor marketing data includes, without limitation, data describing competitor prices, sales, discounts on items, rebates, special offers, incentives, give-a-ways, free food, competitor store locations, competitor store hours of operation, competitor store openings, competitor store close-out sales or going out of business sales, competitor inventory, and/or any other available data regarding competitor marketing.

Customer behavior data is data describing a pattern of events associated with the customer. Customer behavior data includes, without limitation, data describing, locations in the retail facility where the customer has walked, the pace or speed at which the customer is walking, the amount of time the customer browses for items on a shelf before selecting an item and placing the item in the customer's shopping basket or cart, and/or the rate at which the customer selects items for purchase over time. Customer behavior data is generated using either external data gathered outside the retail facility or detection data gathered inside the retail facility.

Set of detectors 212 may be located at any location within retail facility 202. In addition, set of detectors 212 may include multiple detectors located at differing locations within retail facility 202. For example, a detector in set of detectors 212 may be located, without limitation, at an entrance to retail facility 202, on one or more shelves in retail facility 202, and/or on one or more doors and/or doorways in retail facility 202.

For example, set of detectors 212 may include one or more cameras or other image capture devices located inside retail facility 202 for tracking and/or identifying items, containers for items, shopping containers and shopping carts, and/or customers inside retail facility 202 to form internal data. The camera or other detector in set of detectors 212 may be coupled to and/or in communication with the analysis server. In addition, more than one image capture device may be operated simultaneously without departing from the illustrative embodiments of the present invention.

Display devices 214 are multimedia devices for displaying customized marketing messages to customers. Display devices 214 may be any type of display device for presenting a text, graphic, audio, video, and/or any combination of text, graphics, audio, and video to a customer. In this example, display devices 214 are located inside retail facility 202. Display devices 214 include one or more display devices inside retail facility 202 for use and/or viewing by at least one customer.

Display devices 216 include one or more display devices located outside retail facility 202, such as, without limitation, display devices located in a parking lot, queue line, and/or other area outside of retail facility 202. A display device may be implemented as a device such as, without limitation, a personal digital assistant (PDA), a cellular telephone with a display screen, an electronic sign, a laptop computer, a tablet PC, a kiosk, a digital media display, a digital message board, a monitor, a smart watch, a display screen mounted on a shopping container, and/or any other type of device for displaying digital messages to a customer. The display device may optionally include a printer for printing the customized marketing message on a paper medium. Display devices 216 may be used in the absence of display devices 214 inside retail facility 202 or in addition to display devices 214 located inside retail facility 202.

Biometric devices 218 include one or more devices for measuring and/or detecting a change in biometric readings of a customer that exceeds a threshold or baseline change in biometric readings. Biometric readings may include a measurement of a customer's heart rate over a given period of time, blood pressure, voice stress, skin temperature data, body temperature data, pupil dilation, fingerprint data, respiration, and/or an amount of perspiration. If biometric devices 218 measures a change in biometric readings for a customer that exceeds a predefined threshold change that corresponds to a customer viewing an item and/or a marketing message, the change in the customer's biometric readings may be attributed to the item and/or the marketing message.

Container 220 is a container for holding, carrying, transporting, or moving one or more items. For example, container 220 may be, without limitation, a shopping cart, a shopping bag, a shopping basket, and/or any other type of container for holding items. In this example, container 220 is a shopping cart.

In this example in FIG. 2, only one container 220 is depicted inside retail facility 202. However, any number of containers may be used inside and/or outside retail facility 202 for holding, carrying, transporting, or moving items selected by customers.

Container 220 may optionally include biometric device 222. Biometric device 222 is a biometric device attached to or installed on container 220. Biometric device 222 is a device for gathering biometric data, such as biometric devices 218. For example, biometric device 222 may be a device for measuring a customer's heart rate that is attached to or imbedded within a handle on a shopping cart. Biometric device 222 may also be a device attached, coupled to, or associated with any other part or member of a shopping cart or other shopping container.

Container 220 may also optionally include identification tag 224. Identification tag 224 is a tag for identifying container 220, locating container 220 within digital customer marketing environment 200, either inside or outside retail facility 202, and/or associating container 220 with a particular customer. For example, identification tag 224 may be a radio frequency identification (RFID) tag, a universal product code (UPC) tag, a global positioning system (GPS) tag, and/or any other type of identification tag for identifying, locating, and/or tracking a container.

Container 220 may also include display device 226 coupled to, mounted on, attached to, or imbedded within container 220. Display device 226 is a multimedia display device for displaying textual, graphical, video, and/or audio marketing messages to a customer. For example, display device 226 may be a digital display screen or personal digital assistant attached to a handle, front, back, or side member of container 220.

Display device 226 may be operatively connected to a data processing system, such as data processing system 100 connected to digital customer marketing environment 114 in FIG. 1 via wireless, infrared, radio, or other connection technologies known in the art, for the purpose of transferring data to be displayed on display device 226. The data processing system includes the analysis server for analyzing dynamic external customer data obtained from detectors 204-210 and set of detectors 212, as well as internal customer data obtained from one or more databases storing data associated with one or more customers.

Retail items 228 are items of merchandise for sale. Retail items 228 may be displayed on a display shelf (not shown) located in retail facility 202. Other items of merchandise that may be for sale, such as, without limitation, food, beverages, shoes, clothing, household goods, decorative items, or sporting goods, may be hung from display racks, displayed in cabinets, on shelves, or in refrigeration units (not shown). Any other type of merchandise display arrangement known in the retail trade may also be used in accordance with the illustrative embodiments.

For example, display shelves or racks may include, in addition to retail items 228, various advertising displays, images, or postings. A multimedia display device attached to a data processing system may also be included. The images shown on the multimedia display may be changed in real time in response to various events such as the time of day, the day of the week, a particular customer approaching the shelves or rack, or items already placed inside container 220 by the customer.

Retail items 228 may be viewed or identified using an image capture device, such as a camera or other detector in set of detectors 212. To facilitate such viewing, an item may have attached identification tags 230. Identification tags 230 are tags associated with one or more retail items for identifying the item and/or location of the item. For example, identification tags 230 may be, without limitation, a bar code pattern, such as a universal product code (UPC) or European article number (EAN), a radio frequency identification (RFID) tag, or other optical identification tag, depending on the capabilities of the image capture device and associated data processing system to process the information and make an identification of retail items 228. In some embodiments, an optical identification may be attached to more than one side of a given item.

The data processing system, discussed in greater detail in FIG. 3 below, includes associated memory which may be an integral part, such as the operating memory, of the data processing system or externally accessible memory. Software for tracking objects may reside in the memory and run on the processor. The software is capable of tracking retail items 228, as a customer removes an item in retail items 228 from its display position and places the item into container 220. Likewise, the tracking software can track items which are being removed from container 220 and placed elsewhere in the retail store, whether placed back in their original display position or anywhere else including into another container. The tracking software can also track the position of container 220 and the customer.

The software can track retail items 228 by using data from one or more of detectors 204-210 located externally to retail facility 202, internal data captured by one or more detectors in set of detectors 212 located internally to retail facility 202, such as identification data received from identification tags 230 and/or identification data received from identification tags 224.

The software in the data processing system keeps a list of which items have been placed in each shopping container, such as container 220. The list is stored in a database. The database may be any type of database such as a spreadsheet, relational database, hierarchical database or the like. The database may be stored in the operating memory of the data processing system, externally on a secondary data storage device, locally on a recordable medium such as a hard drive, floppy drive, CD ROM, DVD device, remotely on a storage area network, such as storage area network 108 in FIG. 1, or in any other type of storage device.

The lists of items in container 220 are updated frequently enough to maintain a dynamic, accurate, real time listing of the contents of each container as customers add and remove items from containers, such as container 220. The listings of items in containers are also made available to whatever inventory system is used in retail facility 202. Such listings represent an up-to-the-minute view of which items are still available for sale, for example, to on-line shopping customers or customers physically located at retail facility 202. The listings may also provide a demand side trigger back to the supplier of each item. In other words, the listing of items in customer shopping containers can be used to update inventories, determine current stock available for sale to customers, and/or identification of items that need to be restocked or replenished.

At any time, the customer using container 220 may request to see a listing of the contents of container 220 by entering a query at a user interface to the data processing system. The user interface may be available at a kiosk, computer, personal digital assistant, or other computing device connected to the data processing system via a network connection. The user interface may also be coupled to a display device, such as, at a display device in display devices 214, display devices 216, or display device 226 associated with container 220. The customer may also make such a query after leaving the retail store. For example, a query may be made using a portable device or a home computer workstation.

The listing is then displayed at a location where it may be viewed by the customer, such as on a display device in display devices 214 inside retail facility 202, display devices 216 outside retail facility 202, or display device 226 associated with container 220. The listing may include the quantity of each item in container 220, as well as the price for each, a discount or amount saved off the regular price of each item, and a total price for all items in container 220. Other data may also be displayed as part of the listing, such as, additional incentives to purchase one or more other items available in digital customer marketing environment 200.

When the customer is finished shopping, the customer may proceed to a point-of-sale checkout station. In one embodiment, the checkout station may be coupled to the data processing system. Therefore, the items in container 220 are already known to the data processing system due to the dynamic listing of items in container 220 that is maintained as the customer shops in digital customer marketing environment 200. Thus, there is no need for an employee, customer, or other person to scan each item in container 220 to complete the purchase of each item, as is commonly done today. In this example, the customer merely arranges for payment of the total, for example by use of a smart card, credit card, debit card, cash, or other payment method. In some embodiments, it may not be necessary to empty container 220 at the retail facility at all, for example, if container 220 is a minimal cost item which can be kept by the customer.

In other embodiments, container 220 may belong to the customer. In this example, the customer brings container 220 to retail facility 202 at the start of the shopping session. In another embodiment, container 220 belongs to retail facility 202 and must be returned before the customer leaves the parking lot or at some other designated time or place.

In another example, when the customer is finished shopping, the customer may complete checkout either in-aisle or from a final or terminal-based checkout position in the store using a transactional device which may be integral with container 220 or associated temporarily to container 220. The customer may also complete the transaction using a consumer owned computing device, such as a laptop, cellular telephone, or personal digital assistant that is connected to the data processing system via a network connection.

The customer may also make payment by swiping a magnetic strip on a card, using any known or available radio frequency identification (RFID) enabled payment device. The transactional device may also be a portable device such as a laptop computer, palm device, or any other portable device specially configured for such in-aisle checkout service, whether integral with container 220 or separately operable. In this example, the transactional device connects to the data processing system via a network connection to complete the purchase transaction at check out time.

Checkout may be performed in-aisle or at the end of the shopping trip whether from any point or from a specified point of transaction. The customer may also make payment by swiping a magnetic strip on a card, using a radio frequency identification (RFID) enabled payment device with the transactional device, using any biometric type of payment tender via biometric device 218 and/or biometric device 222 known in the art, and/or via any other known or available method for making a payment or concluding a transaction.

As noted above, checkout transactional devices may be stationary shared devices or portable or mobile devices offered to the customer from the store or may be devices brought to the store by the customer, which are compatible with the data processing system and software residing on the data processing system.

Thus, in this depicted example, when a customer enters digital customer marketing environment but before the customer enters retail facility 202, such as a retail store, the customer is detected and identified by one or more detectors in detectors 204-210 to generate external data. If the customer takes a shopping container before entering retail facility 202, the shopping container is also identified. In some embodiments, the customer may be identified through identification of the container.

The customer is tracked using image data and/or other detection data captured by detectors 204-210 as the customer enters retail facility 202. The customer is identified and tracked inside retail facility 202 by one or more detectors inside the facility, such as set of detectors 212. When the customer takes a shopping container, such as container 220, the analysis server uses data from set of detectors 212, such as, identification data from identification tags 230 and 224, to track container 220 and items selected by the customer and placed in container 220.

As a result, an item selected by the customer, for example, as the customer removes the item from its stationary position on a store display, is identified. The selected item may be traced visually by a camera, tracked by another type of detector in set of detectors 212 and/or using identification data from identification tags 230. The item is tracked until the customer places it in container 220 to form a selected item.

Thus, a selected item is identified when a customer removes an item from a store display, such as a shelf, display counter, basket, or hanger. In another embodiment, the selected item is identified when the customer places the item in the customer's shopping basket, shopping bag, or shopping cart. The analysis server then selects one or more upsale items related to the selected items for marketing to the customer. In another embodiment, the analysis server selects one or more cross-sale items correlated to the selected item.

The analysis server stores a listing of selected items placed in the shopping container. The analysis server also stores a listing of upsale items and/or correlated cross-sale items that are marketed to the customer and a listing of actually purchased upsale items and/or correlated cross-sale items that are actually purchased.

In this example, a single container and a single customer is described. However, the aspects of the illustrative embodiments may also be used to track multiple containers and multiple customers simultaneously. In this case, the analysis server will store a separate listing of selected items for each active customer. As noted above, the listings may be stored in a database. The listing of items in a given container is displayed to a customer, employee, agent, or other customer in response to a query. The listing may be displayed to a customer at any time, either while actively shopping, during check-out, or after the customer leaves retail facility 202.

Thus, in one embodiment, a customer entering retail facility 202 is detected by one or more detectors in detectors 204-210. The customer may be identified by the one or more detectors. An analysis server in a data processing system associated with retail facility 202 begins performing data mining on available static customer data, such as, but not limited to, customer profile information and demographic information, for use in generating customized marketing messages targeted to the customer.

In one embodiment, the customer is presented with customized digital marketing messages on one or more display devices in display devices 216 located externally to retail facility 202 before the customer enters retail facility 202. When the customer enters retail facility 202, the customer is typically offered, provided, or permitted to take shopping container 220 for use during shopping. Container 220 may contain a digital media display, such as display device 226, mounted on container 220 and/or customer may be offered a handheld digital media display device, such as a display device in display devices 214. In the alternative, the customer may be encouraged to use strategically placed kiosks running digital media marketing messages throughout retail facility 202. Display device 226, 214, and/or 216 may include a verification device for verifying an identity of the customer.

For example, display device 214 may include a radio frequency identification tag reader 232 for reading a radio frequency identification tag, a smart card reader for reading a smart card, or a card reader for reading a specialized store loyalty or frequent customer card. Once the customer has been verified, the data processing system retrieves past purchase history, total potential wallet-share, shopper segmentation information, customer profile data, granular demographic data for the customer, and/or any other available customer data elements using known or available data retrieval and/or data mining techniques. These customer data elements are analyzed using at least one data model to determine appropriate digital media content to be pushed, ondemand, throughout the store to customers viewing display devices 214, 216, and/or display device 226.

The customer is provided with incentives to use display devices 214, 216, and/or display device 226 to obtain marketing incentives, promotional offers, and discounts for upsale items and/or cross-sale items correlated to one or more selected items. When the customer has finished shopping, the customer may be provided with a list of savings or "tiered" accounting of savings over the regular price of purchased items if a display device had not been used to view and use customized digital marketing messages.

This process provides an intelligent guided selling methodology to optimize customer throughput in the store, thereby maximizing or optimizing total retail content and/or retail sales, profit, and/or revenue for retail facility 202. It will be appreciated by one skilled in the art that the words "optimize", "optimizating" and related terms are terms of art that refer to improvements in speed and/or efficiency of a computer implemented method or computer program, and do not purport to indicate that a computer implemented method or computer program has achieved, or is capable of achieving, an "optimal" or perfectly speedy/perfectly efficient state.

Figure 3:
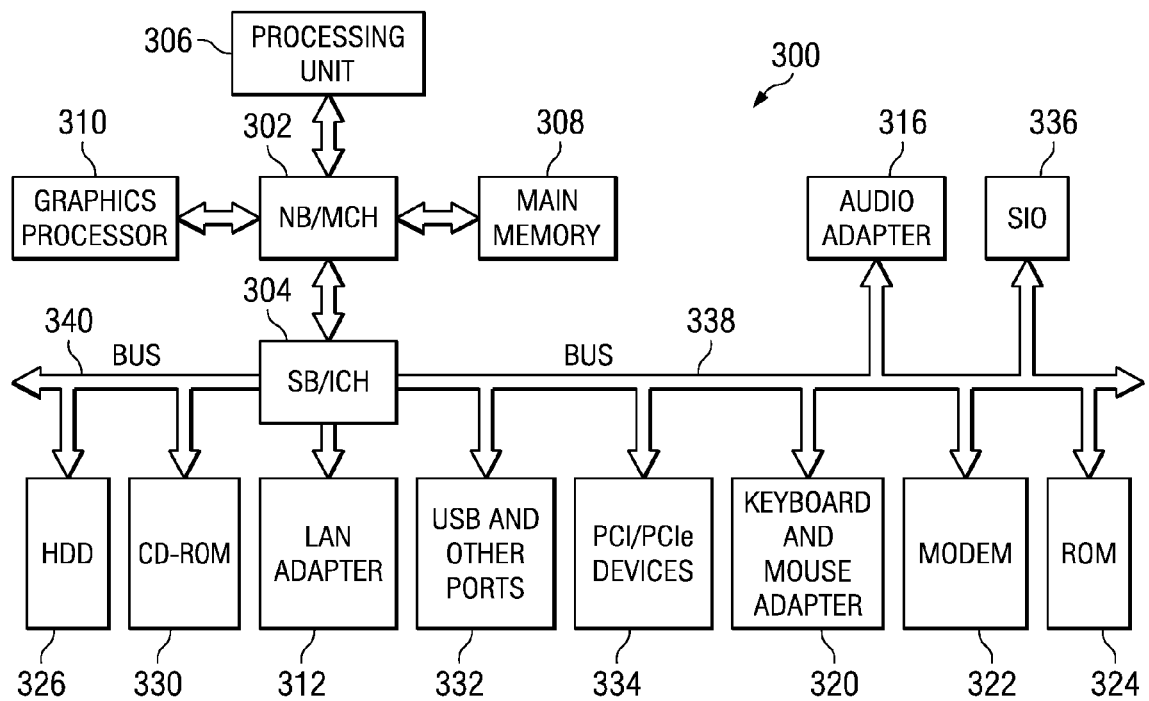
FIG. 3 is a block diagram of a data processing system in which illustrative embodiments may be implemented.

Next, FIG. 3 is a block diagram of a data processing system in which illustrative embodiments may be implemented. Data processing system 300 is an example of a computer, such as server 104 or client 110 in FIG. 1, in which computer usable code or instructions implementing the processes may be located for the illustrative embodiments.

In this example, data is transmitted from data processing system 300 to the retail facility over a network, such as network 102 in FIG. 1. In another embodiment, data processing system 300 is located on-site at the retail facility.

In the depicted example, data processing system 300 employs a hub architecture including a north bridge and memory controller hub (MCH) 302 and a south bridge and input/output (I/O) controller hub (ICH) 304. Processing unit 306, main memory 308, and graphics processor 310 are coupled to north bridge and memory controller hub 302. Processing unit 306 may contain one or more processors and even may be implemented using one or more heterogeneous processor systems. Graphics processor 310 may be coupled to the MCH through an accelerated graphics port (AGP), for example.

In the depicted example, local area network (LAN) adapter 312 is coupled to south bridge and I/O controller hub 304 and audio adapter 316, keyboard and mouse adapter 320, modem 322, read only memory (ROM) 324, universal serial bus (USB) ports and other communications ports 332, and PCI/PCIe devices 334 are coupled to south bridge and I/O controller hub 304 through bus 338, and hard disk drive (HDD) 326 and CD-ROM drive 330 are coupled to south bridge and I/O controller hub 304 through bus 340. PCI/PCIe devices may include, for example, Ethernet adapters, add-in cards, and PC cards for notebook computers. PCI uses a card bus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be coupled to south bridge and I/O controller hub 304.

An operating system runs on processing unit 306 and coordinates and provides control of various components within data processing system 300 in FIG. 3. The operating system may be a commercially available operating system such as Microsoft Windows® XP (Microsoft and Windows are trademarks of Microsoft Corporation in the United States, other countries, or both). An object oriented programming system, such as the Java programming system, may run in conjunction with the operating system and provides calls to the operating system from Java programs or applications executing on data processing system 300. Java and all Java-based trademarks are trademarks of Sun Microsystems, Inc. in the United States, other countries, or both.

Instructions for the operating system, the object-oriented programming system, and applications or programs are located on storage devices, such as hard disk drive 326, and may be loaded into main memory 308 for execution by processing unit 306. The processes of the illustrative embodiments may be performed by processing unit 306 using computer implemented instructions, which may be located in a memory such as, for example, main memory 308, read only memory 324, or in one or more peripheral devices.

In some illustrative examples, data processing system 300 may be a personal digital assistant (PDA), which is generally configured with flash memory to provide non-volatile memory for storing operating system files and/or customer-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 308 or a cache such as found in north bridge and memory controller hub 302. A processing unit may include one or more processors or CPUs.

Figure 4:
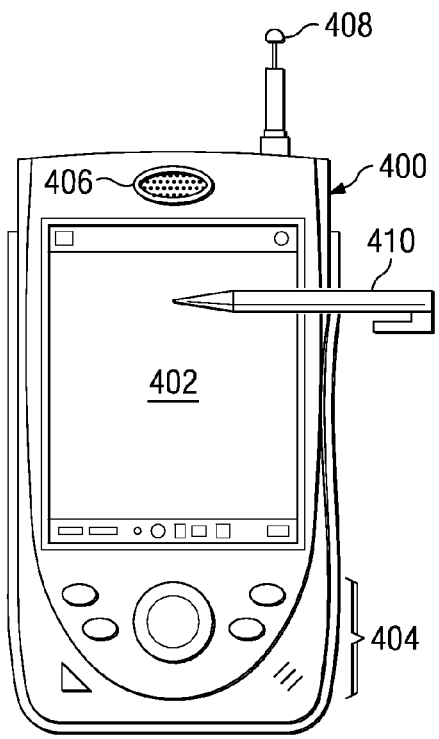
FIG. 4 is a diagram of a display device in the form of a personal digital assistant (PDA) in accordance with a preferred embodiment of the present invention.

With reference now to FIG. 4, a diagram of a display device in the form of a personal digital assistant (PDA) is depicted in accordance with a preferred embodiment of the present invention. Personal digital assistant 400 includes a display screen 402 for presenting textual and graphical information. Display screen 402 may be a known display device, such as a liquid crystal display (LCD) device. The display may be used to present a map or directions, calendar information, a telephone directory, or an electronic mail message. In these examples, display screen 402 may receive customer input using an input device such as, for example, stylus 410.

Personal digital assistant 400 may also include keypad 404, speaker 406, and antenna 408. Keypad 404 may be used to receive customer input in addition to using display screen 402. Speaker 406 provides a mechanism for audio output, such as presentation of an audio file. Antenna 408 provides a mechanism used in establishing a wireless communications link between personal digital assistant 400 and a network, such as network 102 in FIG. 1. Personal digital assistant 400 also preferably includes a graphical user interface that may be implemented by means of systems software residing in computer readable media in operation within personal digital assistant 400.

Figure 5:
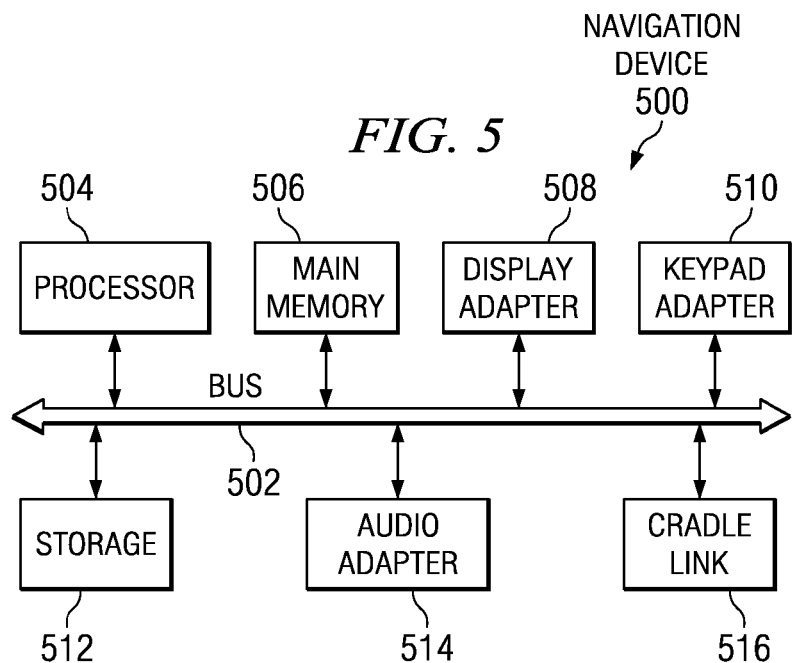
FIG. 5 is a block diagram of a personal digital assistant display device in accordance with a preferred embodiment of the present invention.

Turning now to FIG. 5, a block diagram of a personal digital assistant display device is shown in accordance with a preferred embodiment of the present invention. Personal digital assistant 500 is an example of a personal digital assistant, such as personal digital assistant 400 in FIG. 4, in which code or instructions implementing the processes of the present invention for displaying customized digital marketing messages may be located. Personal digital assistant 500 includes a bus 502 to which processor 504 and main memory 506 are connected. Display adapter 508, keypad adapter 510, storage 512, and audio adapter 514 also are connected to bus 502. Cradle link 516 provides a mechanism to connect personal digital assistant 500 to a cradle used in synchronizing data in personal digital assistant 500 with another data processing system. Further, display adapter 508 also includes a mechanism to receive customer input from a stylus when a touch screen display is employed.

An operating system runs on processor 504 and is used to coordinate and provide control of various components within personal digital assistant 500 in FIG. 5. The operating system may be, for example, a commercially available operating system such as Windows CE, which is available from Microsoft Corporation. Instructions for the operating system and applications or programs are located on storage devices, such as storage 512, and may be loaded into main memory 506 for execution by processor 504.

The depicted examples in FIGS. 1-5 are not meant to imply architectural limitations. The hardware in FIGS. 1-5 may vary depending on the implementation. Other internal hardware or peripheral devices, such as flash memory, equivalent non-volatile memory, or optical disk drives and the like, may be used in addition to or in place of the hardware depicted in FIGS. 1-5. Also, the processes of the illustrative embodiments may be applied to a multiprocessor data processing system.

Figure 6:
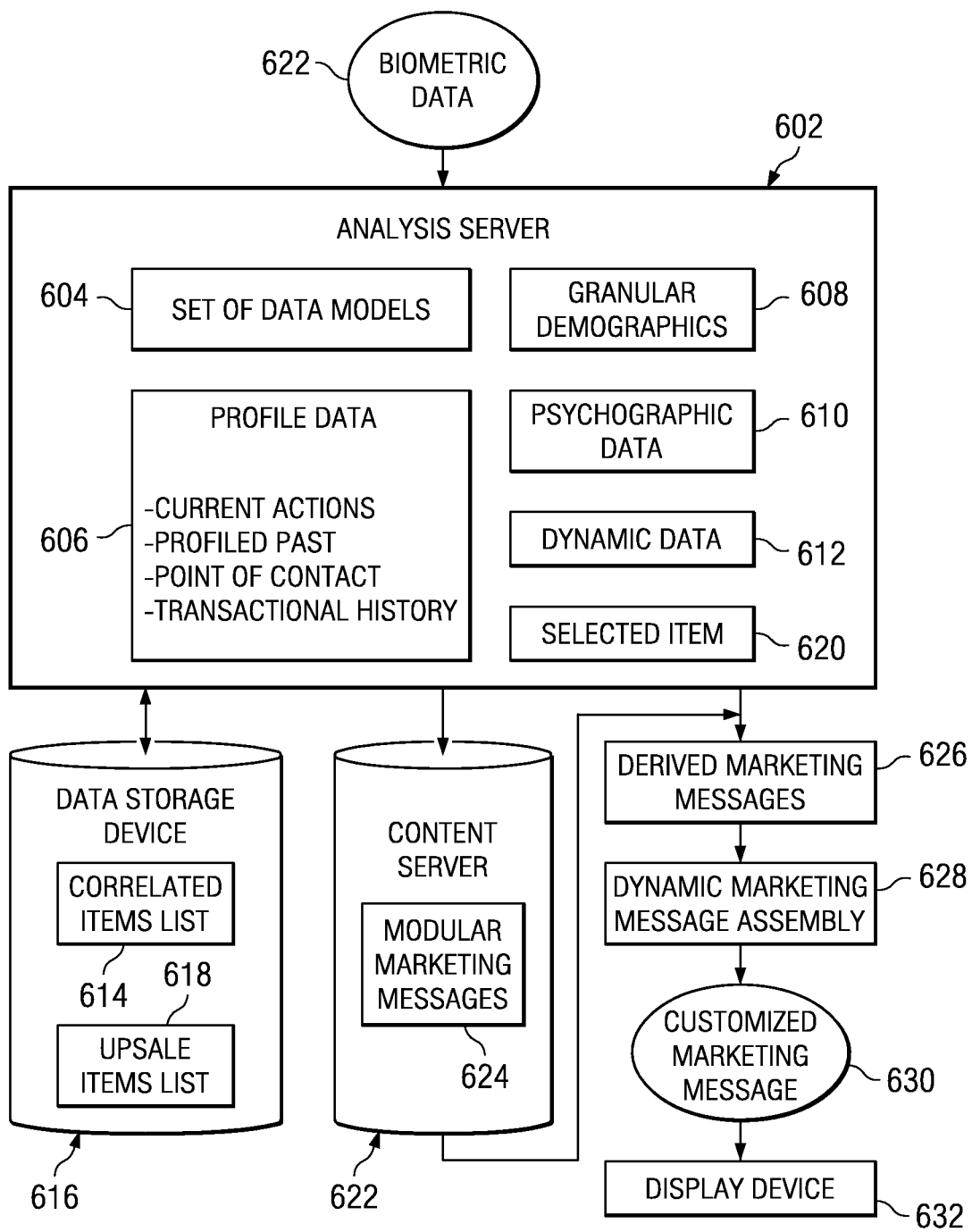
FIG. 6 is a block diagram of a data processing system for analyzing biometric data for use in generating customized marketing messages that promote upsale and cross-sale of items in accordance with an illustrative embodiment.

Referring now to FIG. 6, a block diagram of a data processing system for analyzing biometric data for use in generating customized marketing messages that promote upsale and cross-sale of items is shown in accordance with an illustrative embodiment. Data processing system 600 is a data processing system, such as data processing system 100 in FIG. 1 and/or data processing system 300 in FIG. 3. Analysis server 602 may be a server, such as server 104 in FIG. 1 or data processing system 300 in FIG. 3. Analysis server 602 includes set of data models 604 for analyzing dynamic customer data elements and static customer data elements.

Set of data models 604 is one or more data models created a priori or pre-generated for use in analyzing biometric data and customer data objects for personalizing content of marketing messages presented to the customer. Set of data models 604 includes one or more data models for identifying customer data objects and determining relationships between the customer data objects. The data models in set of data models 604 are generated using at least one of a statistical method, a data mining method, a causal model, a mathematical model, a marketing model, a behavioral model, a psychological model, a sociological model, or a simulation model.

Profile data 606 is data describing one or more customers. In this example, profile data 606 includes point of contact data, profiled past data, current actions data, transactional history data, certain click-stream data, granular demographics 608, psychographic data 610, customer provided registration data, account data and/or any other static customer data.

Point of contact data is data regarding a method or device used by a customer to interact with a data processing system associated with a retail facility and/or receive customized marketing messages for display. The customer interacts with the data processing system using a computing device or display terminal having a user interface for inputting data and/or receiving output. The device or terminal may be implemented as display device 632 provided by the retail facility and/or a device belonging to or provided by the customer.

If display device 632 is a display device associated with the retail facility, details and information regarding display device 632 will be known to analysis server 602. However, if display device 632 is a display device belonging to the customer or brought to the retail facility by the customer, analysis server 602 may identify the type of display device using techniques such as interrogation commands, cookies, or any other known or equivalent technique. From the type of device other constraints may be determined such as display size, resolution, refresh rate, color capability, keyboard entry capability, other entry capability such as pointer or mouse, speech recognition and response, language constraints, and any other fingertip touch point constraints and assumptions about customer state of the display device. For example, someone using a cellular phone may have a limited time window for making phone calls and be sensitive to location and local time of day, whereas a casual home browser may have a greater luxury of time and faster connectivity.

An indication of a location for the point of contact may also be determined. For example, global positioning system (GPS) coordinates of the customer may be determined if the customer device has such a capability whether by including a real time global positioning system receiver or by periodically storing global positioning system coordinates entered by some other method. Other location indications may also be determined such as post office address, street or crossroad coordinates, latitude-longitude coordinates or any other location indicating system.

Analysis server 602 may also determine the connectivity associated with the customer's point of contact. For example, the customer may be connected to the merchant or supplier in any of a number ways such as a modem, digital modem, network, wireless network, Ethernet, intranet, or high speed lines including fiber optic lines. Each way of connection imposes constraints of speed, latency, and/or mobility which can then also be determined.

The profiled past comprises data that may be used, in whole or in part, for individualization of customized marketing message 630. Global profile data may be retrieved from a file, database, data warehouse, or any other data storage device. Multiple storage devices and software may also be used to store profile data 606. Some or all of the data may be retrieved from the point of contact device, as well. The profiled past may comprise an imposed profile, global profile, individual profile, and demographic profile. The profiles may be combined or layered to define the customer for specific promotions and marketing offers.

In the illustrative embodiments, a global profile includes data on the customer's interests, preferences, and affiliations. The profiled past may also comprise retrieving purchased data. Various firms provide data for purchase which is grouped or keyed to presenting a lifestyle or life stage view of customers by block or group or some other baseline parameter. The purchased data presents a view of one or more customers based on aggregation of data points such as, but not limited to geographic block, age of head of household, income level, number of children, education level, ethnicity, and purchasing patterns.

The profiled past may also include navigational data relating to the path the customer used to arrive at a web page which indicates where the customer came from or the path the customer followed to link to the merchant or supplier's web page. Transactional data of actions taken is data regarding a transaction. For example, transaction data may include data regarding whether the transaction is a first time transaction or a repeat transaction, and/or how much the customer usually spends. Information on how much a customer generally spends during a given transaction may be referred to as basket share. Data voluntarily submitted by the customer in responding to questions or a survey may also be included in the profiled past.

Current actions, also called a current and historical record, are also included in profile data 606. Current actions is data defining customer behavior, such as listings of the purchases made by the customer, payments and returns made by the customer, and/or click-stream data from a point of contact device of the customer. Click-stream data is data regarding a customer's navigation of an online web page of the merchant or supplier. Click-stream data may include page hits, sequence of hits, duration of page views, response to advertisements, transactions made, and conversion rates. Conversion rate is the number of times the customer takes action divided by the number of times an opportunity is presented.

In this example, profiled past data for a given customer is stored in analysis server 602. However, in accordance with the illustrative embodiments, profiled past data may also be stored in any local or remote data storage device, including, but not limited to, a device such as storage area network 108 in FIG. 1 or read only memory (ROM) 324 and/or compact disk read only memory (CD-ROM) 330 in FIG. 3.

Granular demographics 608 are a source of static customer data elements. Static customer data elements are data elements that do not tend to change in real time, such as a customer's name, date of birth, and address. Granular demographics 608 provides a detailed demographics profile for one or more customers. Granular demographics 608 may include, without limitation, ethnicity, block group, lifestyle, life stage, income, and education data. Granular demographics 608 may be used as an additional layer of profile data 606 associated with a customer.

Psychographic data 610 refers to an attitude profile of the customer. Examples of attitude profiles include, without limitation, a trend buyer, a time-strapped person who prefers to purchase a complete outfit, a cost-conscious shopper, a customer that prefers to buy in bulk, or a professional buyer who prefers to mix and match individual items from various suppliers.

Dynamic data 612 is data that includes dynamic customer data elements that are changing in real-time. For example, dynamic customer data elements could include, without limitation, the current contents of a customer's shopping basket, the time of day, the day of the week, whether it is the customer's birthday or other holiday observed by the customer, customer's responses to marketing messages and/or items viewed by the customer, customer location, the customer's current shopping companions, the speed or pace at which the customer is walking through the retail facility, and/or any other dynamically changing customer information. Dynamic data 612 also includes external data, grouping data, customer identification data, customer behavior data, and/or current events data.

Dynamic data 612 is processed and/or analyzed to generate customized marketing messages and/or for utilization in selecting upsale and/or cross-sale items to be marketed to the customer. Processing dynamic data 612 includes, but is not limited to, filtering dynamic data 612 for relevant data elements, combining dynamic data 612 with other dynamic customer data elements, comparing dynamic data 612 to baseline or comparison models for external data, and/or formatting dynamic data 612 for utilization and/or analysis in one or more data models in set of data models 604. The processed dynamic data 612 is analyzed and/or further processed using one or more data models in set of data models 604.

Correlated items list 614 is a list of one or more items that provides a different basic functionality than an item selected by the customer for purchase. The items in the list of correlated items are items that are different than selected item 620. Selected item 620 is an identification of an item selected by a customer. An item is identified as selected item 620 when a customer looks at an item, reaches for an item, touches an item, picks up an item, places the item in a shopping container, such as container 220 in FIG. 2, places the item at a point of sale counter, purchases the item, indicates an interest in purchasing the item, makes a query regarding the item, requests information regarding the item, asks the merchant or sales person questions regarding the item, asks the merchant or sales person to see the item, or otherwise signals an intention to purchase the item.

An item is identified as selected item 620 by analyzing video images of a customer selecting the item, analyzing radio frequency identification tag data captured by a radio frequency identification tag reader, analyzing motion sensor data and/or pressure sensor data from pressure sensors in contact with the item, and/or any other data associated with the customer, the customer's movements and behavior, and the location of the item being selected.

The items in the list of correlated items are items that are frequently purchased in conjunction with selected item 620. For example, if a customer selects hot dog buns, hot dogs are frequently purchased in conjunction with the hot dog buns by a significant percentage of customers.

Analysis server 602 generates a list of correlated items by identifying a plurality of items purchased by a set of two or more customers. The plurality of items are identified using past purchasing histories for customers, sales records, customer profiles, customer behavior data, and/or data describing items purchased by customers during a single shopping trip. Analysis server 602 analyzes the plurality of items using a set of correlation techniques to identify items that are typically purchased in correlation with one or more other items providing a different basic functionality to form correlated items list 614.

List of correlated items 614 is stored in data storage device 616. Data storage device 616 is any type of data storage device, such as storage 108 in FIG. 1. Data storage device 616 may be located locally to analysis server 602 or remotely to analysis server 602. Data storage device 616 may be implemented as a single data storage device or as multiple data storage devices.

Upsale items list 618 is a list of items that provide the same basic functionality as one or more selected items. An upsale item may be a different size than a size of selected item 620, a different brand than a brand of selected item 620, a different price than a price of selected item 620, or a different packaging than a packaging of selected item 620. Upsale items may also provide an additional feature or functionality than selected item 620. Upsale items produce a greater amount of profit or revenue than a sale of the selected item. In other words, a sale of at least one upsale item produces a greater amount of revenue or a greater amount of profit than a sale of selected item 620. In addition, users of the system can choose to utilize the process to increase profit even if revenue remains the same or decreases. In another embodiment, the process is used to increase both profit and revenue.

In this example, analysis server 602 also uses dynamic data 612 to select a set of one or more upsale items from upsale items list 618. Dynamic data 612 is used to select at least one upsale item in upsale items list 618 that is most likely to be purchased by the customer to form the set of promoted upsale items.

Likewise, analysis server 602 also uses dynamic data 612 to select a set of one or more cross-sale items from correlated items list 614. Dynamic data 612 is used to select at least one cross-sale item in correlated items list 614 that is most likely to be purchased by the customer to form a set of promoted cross-sale items.

List of correlated items 614 and/or upsale items list 618 may be pre-generated or generated dynamically as the customer is shopping. In another example, list of correlated items 614 and/or upsale items list 618 are generated by a different analysis server than analysis server 602. In this example, the different analysis server stores a list of correlated items 614 and/or upsale items list 618 in data storage device 616 for retrieval by analysis server 602.

Biometric data 622 is data regarding a customer's physical responses. For example, biometric data may include data regarding a customer's heart rate over a period of time, a fingerprint, a retinal pattern, a voice stress measurement, a measurement of a change in pupil dilation as compared to changes in the ambient light levels, body temperature, a change in skin temperature, a change in body temperature, a rate or amount of perspiration, respiratory rate, and/or any other measurement of a customer's physical traits or physical responses.

Biometric data 622 may be used to determine a customer's response to an item or marketing message being viewed by a customer at the time a change in a biometric reading takes place. For example, if a customer's heart rate or pupil dilation changes while viewing a marketing message, the change in the heart rate or pupil dilation may be attributed to the marketing message. Biometric data 622 is used to identify selected item 620. For example, if a customer's biometric responses change when the customer is looking at an item or holding an item, analysis server 602 identifies the item as selected item 620. Biometric data 622 is also used to generate customized marketing messages. If a customer's biometric responses change while the customer is viewing a marketing message, the customer's responses are used to modify the marketing messages presented to the user. If biometric data 622 indicates a favorable response to marketing message elements, those marketing message elements are used more frequently. If biometric data 622 indicates a negative response to marketing message elements, those marketing message elements are used less frequently and/or those elements are not used or avoided in future marketing messages.

Biometric data such as, without limitation, fingerprint scans, retinal scans, and voice print analysis may also be used to dynamically identify a customer while the customer is outside the retail marketing facility, as well as after the customer has entered or is inside the retail marketing facility. For example, a fingerprint scanner on a shopping container or a display device may be used to determine or verify a customer's identity.

Biometric data 622 is gathered or captured by a set of biometric devices, such as biometric device 222 and 218 in FIG. 2. The set of biometric devices includes one or more biometric devices located within a retail environment, such as digital customer marketing environment 200 in FIG. 2. The biometric devices in a set of biometric devices may be located inside a retail facility and/or outside a retail facility. For example, a biometric device may be located on a shopping cart that is temporarily located outside the retail facility. The shopping cart may be moved outside by a customer leaving the store. The shopping cart may also be found by a customer arriving at the retail facility. In this case, the customer may select the shopping cart located outside the retail facility and take the cart inside the store as the customer enters the retail facility.

Content server 622 is a server for storing modular marketing messages 624, such as server 104 in FIG. 1 or data processing system 300 in FIG. 3. Modular marketing messages 624 are two or more self contained marketing message components that may be combined with one or more other modular marketing messages to form customized marketing message 630. Modular marketing messages 624 can be quickly and dynamically assembled and disseminated to the customer in real-time.

In this illustrative example, modular marketing messages 624 are pre-generated, preexisting marketing message units that are created prior to generating or analyzing dynamic data 612 and/or biometric data 622 using one or more data models to generate a personalized marketing message for the customer. Although modular marketing messages 624 are pre-generated, modular marketing messages 624 may also include templates imbedded within modular marketing messages for adding personalized information, such as a customer's name or address, to the customized marketing message.

Derived marketing messages 626 is a software component for determining which modular marketing messages in modular marketing messages 624 should be combined or utilized to dynamically generate customized marketing message 630 for the customer in real time. Derived marketing messages 626 uses the output generated by analysis server 602 as a result of analyzing dynamic data 612 associated with a customer using one or more appropriate data models in set of data models 604 to identify one or more modular marketing messages for the customer. The output generated by analysis server 602 from analyzing dynamic data 612 using appropriate data models in set of data models 604 includes marketing message criteria for the customer. Derived marketing messages 626 uses the marketing message criteria for the customer to select modular marketing messages 624 for customized marketing message 630.

A marketing message 630 is a personalized message that presents an incentive or offer regarding a product or item that is being marketed, advertised, promoted, and/or offered for sale. A customized marketing message by presented to a customer visually on a digital display device and/or in an audio format via speakers or any other sound system, and/or marketing messages printed out on a paper medium by a printer. The customized marketing message may include textual content, graphical content, moving video content, still images, audio content, and/or any combination of textual, graphical, moving video, still images, and audio content.

In the illustrative embodiments presented herein, the marketing messages are messages promoting sales of upsale and cross-sale items. Customized marketing message 630 is generated using personalized marketing message criteria, which includes criteria for selecting one or more modular marketing messages for inclusion in customized marketing message 630. The personalized marketing message criteria may include one or more criterion. The personalized marketing message criteria may be generated, in part, a priori and in part dynamically in real-time based on the dynamic data for the customer and/or any available static customer data associated with the customer.

If an analysis of dynamic data 612 indicates that the customer is shopping with a large dog, the personal marketing message criteria may include criteria to indicate marketing of pet food and items for large dogs. Because people with large dogs often have large yards, the personal marketing message criteria may also indicate that yard items, such as yard fertilizer, weed killer, or insect repellant may should be marketed. The personal marketing message criteria may also indicate marketing elements designed to appeal to animal lovers and pet owners, such as incorporating images of puppies, images of dogs, phrases such as "man's best friend", "puppy love", advice on pet care and dog health, and/or other pet friendly images, phrases, and elements to appeal to the customer's tastes and interests.

Derived marketing messages 626 uses the personalized marketing message criteria output by one or more data models in set of data models 604 to identify modular marketing messages to be combined together to form customized marketing message 630 for the customer. For example, a first modular marketing message may be a special on a more expensive brand of peanut butter. A second modular marketing message may be a discount on jelly when peanut butter is purchased. In response to marketing message criteria that indicates the customer frequently purchases cheaper brands of peanut butter, the customer has children, and the customer is currently in an aisle of the retail facility that includes jars of peanut butter, derived marketing messages 626 will select the first marketing message and the second marketing message based on the marketing message criteria for the customer.

Dynamic marketing message assembly 628 is a software component for combining the one or more modular marketing messages selected by derived marketing messages 626 to form customized marketing message 630. In the example above, after derived marketing messages 626 selects the first modular marketing message and the second modular marketing message based on the marketing message criteria, dynamic marketing message assembly 628 combines the first and second modular marketing messages to generate a customized marketing message offering the customer a discount on both the peanut butter and jelly if the customer purchases the more expensive brand of peanut butter. In this manner, dynamic marketing message assembly 628 provides assembly of customized marketing message 630 based on output from the data models analyzing dynamic data 612 and/or biometric data 622 associated with the customer.

Customized marketing message 630 is a customized and unique marketing message for an upsale item and/or a cross-sale item associated with selected item 620. The marketing message is a one-to-one customized marketing message for a specific customer. Customized marketing message 630 is generated using biometric data 622, dynamic data 612 and/or static customer data elements, such as the customer's demographics and psychographics, to achieve this unique one-to-one marketing. Dynamic data 612 may include, without limitation, grouping data, customer identification data, current events data, and customer behavior data.

For example, if modular marketing messages 624 include marketing messages identified by numerals 1-20, customized marketing message 630 may be generated using marketing messages 2, 8, 9, and 19. In this example, modular marketing messages 2, 8, 9, and 19 are combined to create a customized marketing message that is generated for display to the customer rather than displaying the exact same marketing messages to all customers. Customized marketing message 630 is displayed on display device 632.

Customized marketing message 630 may include advertisements, sales, special offers, incentives, opportunities, promotional offers, rebate information and/or rebate offers, discounts, and opportunities. An opportunity may be a "take action" opportunity, such as asking the customer to make an immediate purchase, select a particular item, request a download, provide information, or take any other type of action. Customized marketing message 630 may also include content or messages pushing advertisements and opportunities to effectively and appropriately drive the point of contact customer to some conclusion or reaction desired by the merchant.

Customized marketing message 630 is formed in a dynamic closed loop manner in which the content delivery depends on dynamic data 612, as well as other dynamic customer data elements and static customer data, such as profile data 606 and granular demographics 608. Therefore, all interchanges with the customer may sense and gather data associated with customer behavior, which is used to generate customized marketing message 630.

Display device 632 is a multimedia display for presenting customized marketing messages to one or more customers. Display device 632 is implemented in a device such as display devices 216, 218, and/or 226 in FIG. 2 or display device 632.

Thus, a merchant has a capability for interacting with the customer on a direct one-to-one level by sending customized marketing message 630 to display device 632. Customized marketing message 630 may be sent and displayed to the customer via a network. For example, customized marketing message 630 may be sent via a web site accessed as a unique uniform resource location (URL) address on the World Wide Web, as well as any other networked connectivity or conventional interaction including, but not limited to, a telephone, computer terminal, cell phone or print media.

Display device 632 may be a display device mounted on a shopping cart, a shopping basket, a shelf or compartment in a retail facility, included in a handheld device carried by the customer, or mounted on a wall in the retail facility. In response to displaying customized marketing message 630, a customer can select to print the customized marketing message 630 as a coupon and/or as a paper or hard copy for later use. In another embodiment, display device 632 automatically prints customized marketing message 630 for the customer rather than displaying customized marketing message 630 on a display screen or in addition to displaying customized marketing message 630 on the display screen.

In another embodiment, display device 632 provides an option for a customer to save customized marketing message 630 in an electronic form for later use. For example, the customer may save customized marketing message 630 on a hand held display device, on a flash memory, a customer account in a data base associated with analysis server 602, or any other data storage device. In this example, when customized marketing message 630 is displayed to the customer, the customer is presented with a "use offer now" option and a "save offer for later use" option. If the customer chooses the "save offer" option, the customer may save an electronic copy of customized marketing message 630 and/or print a paper copy of customized marketing message 630 for later use.

Customized marketing message 630 is generated and delivered to the customer in response to the customer choosing selected item 620. Customized marketing message 630 prompts the customer to purchase an upsale item instead of selected item 620. In another embodiment, customized marketing message 630 prompts the customer to purchase one or more correlated cross-sale items in addition to purchasing selected item 620.

Figure 7:
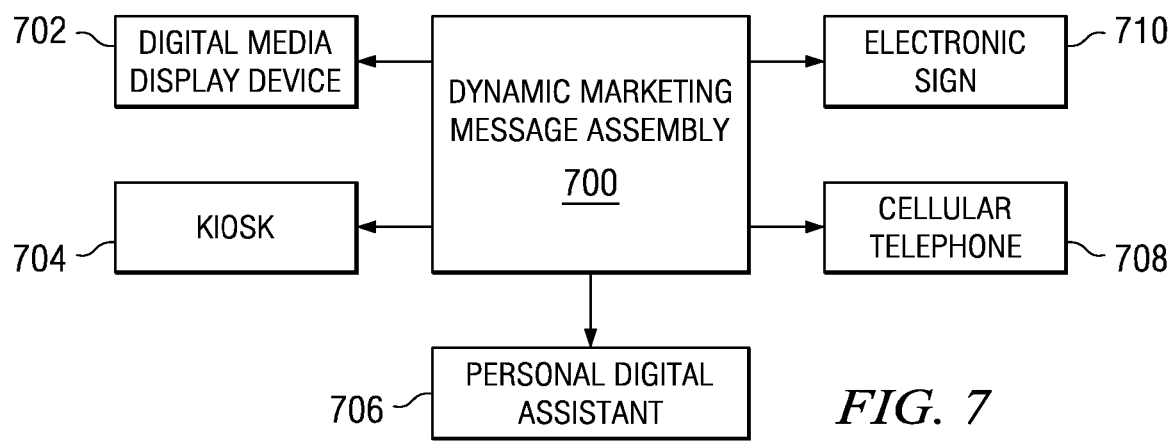
FIG. 7 is a block diagram of a dynamic marketing message assembly transmitting a customized marketing message to a set of display devices in accordance with an illustrative embodiment.

FIG. 7 is a block diagram of a dynamic marketing message assembly transmitting a customized marketing message to a set of display devices in accordance with an illustrative embodiment. Dynamic marketing message assembly 700 is a software component for combining modular marketing messages into a customized marketing message for a customer, such as dynamic marketing message assembly 628 in FIG. 6. Dynamic marketing message assembly 700 transmits a customized marketing message, such as customized marketing message 630 in FIG. 6, to one or more display devices in a set of display devices.

In this example, the set of display devices includes, but is not limited to, digital media display device 702, kiosk 704, personal digital assistant 706, cellular telephone 708, and/or electronic sign 710. A set of display devices in accordance with the illustrative embodiments may include any combination of display devices and any number of each type of display device. For example, a set of display devices may include, without limitation, six kiosks, fifty personal digital assistants, and no cellular telephones. In another example, the set of display devices may include electronic signs and kiosks but no personal digital assistants or cellular telephones.

Digital media display device 702 is a device for displaying content, such as, without limitation, a monitor, a plasma screen, a liquid crystal display screen, and/or any other type of digital media display device.

Kiosk 704 is a structure having one or more open sides, such as a booth. The kiosk includes a computing device associated with a display screen located inside or in association with the structure. The computing device may include a user interface for a user to provide input to the computing device and/or receive output. For example, the user interface may include, but is not limited to, a graphical user interface (GUI), a menu-driven interface, a command line interface, a touch screen, a voice recognition system, an alphanumeric keypad, and/or any other type of interface.

Personal digital assistant 706 is a device, such as, but not limited to, personal digital assistant 400 in FIG. 4 and/or personal digital assistant 500 in FIG. 5. Cellular telephone 708 is any type of cellular telephone or wireless mobile telephone. Cellular telephone 708 includes a display screen that is capable of displaying pictures, graphics, and/or text. Additionally, cellular telephone 708 may also include an alphanumeric keypad, joystick, and/or buttons for providing input to cellular telephone 708. The alphanumeric keypad, joystick, and/or buttons may be used to initiate various functions in cellular telephone 708. These functions include for example, activating a menu, displaying a calendar, receiving a call, initiating a call, displaying a customized marketing message, saving a customized marketing message, and/or selecting a saved customized marketing message.

Electronic sign 710 is an electronic messaging system, such as, without limitation, an outdoor electronic light emitting diode (LED) display, moving message boards, variable message signs, tickers, electronic message centers, video boards, and/or any other type of electronic signage.

A display device may be located externally to the retail facility to display marketing messages to the customer before the customer enters the retail facility. In another embodiment, the customized marketing message is displayed to the customer on a display device inside the retail facility after the customer enters the retail facility and begins shopping.

Figure 8:
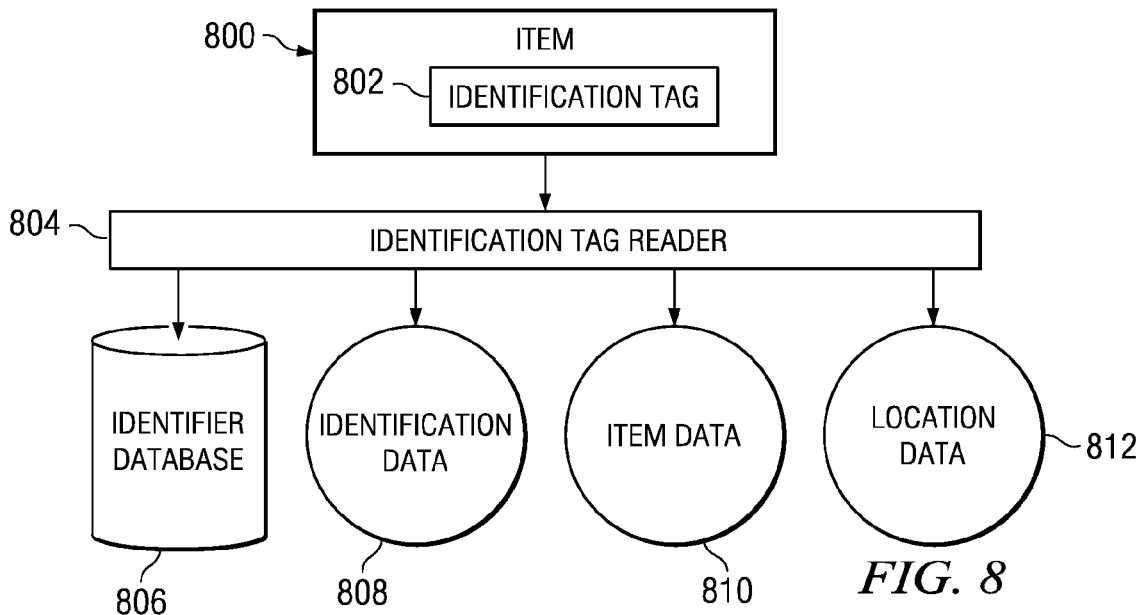
FIG. 8 is a block diagram of an identification tag reader for gathering data associated with one or more items in accordance with an illustrative embodiment.

Turning now to FIG. 8, a block diagram of an identification tag reader for gathering data associated with one or more items is shown in accordance with an illustrative embodiment. Item 800 is an item, such as, without limitation, retail items 228 in FIG. 2. Identification tag 802 associated with item 800 is a tag for providing information describing item 800 to identification tag reader 804. Identification tag 802 is a tag such as a tag in identification tags 230 in FIG. 2. Identification tag 802 may be a bar code, a radio frequency identification tag, a global positioning system tag, and/or any other type of tag.

Radio Frequency Identification tags include read-only identification tags and read-write identification tags. A read-only identification tag is a tag that generates a signal in response to receiving an interrogate signal from an item identifier but the tag does not have a memory. A read-write identification tag is a tag that responds to write signals by writing data to a memory within the identification tag. A read-write tag can respond to interrogate signals by sending a stream of data encoded on a radio frequency carrier. The stream of data can be large enough to carry multiple identification codes. In this example, identification tag 802 is a radio frequency identification tag.

Identification tag reader 804 is a device for retrieving information from identification tag 802, such as, but is not limited to, a radio frequency identification tag reader or a bar code reader. A bar code reader is a device for reading a bar code, such as a universal product code. Identification tag reader 804 may be implemented as a tag reader, such as identification tag reader 232 in FIG. 2. In this example, identification tag reader 804 provides identification data 808, item data 810, and/or location data 812 to an analysis server, such as analysis server 602 in FIG. 6.

Identification data 808 is data regarding the product name and/or manufacturer name of item 800. Item data 810 is information regarding item 800, such as, without limitation, the regular price, sale price, product weight, and/or tare weight for item 800. Identification data 808 is used to identify a selected item, such as selected item 620 in FIG. 6. Once the selected item has been identified, one or more upsale items and/or correlated cross-sale items are identified for marketing to the customer.

Location data 812 is data regarding a location of item 800 within the retail facility and/or outside the retail facility. For example, if identification tag 802 is a bar code, the item associated with identification tag 802 must be in close physical proximity to identification tag reader 804 for a bar code scanner to read a bar code on item 800. Therefore, location data 812 is data regarding the location of identification tag reader 804 currently reading identification tag 802. However, if identification tag 802 is a global positioning system tag, a substantially exact or precise location of item 800 may be obtained using global positioning system coordinates obtained from the global positioning system tag.

Identifier database 806 is a database for storing any information that may be needed by identification tag reader 804 to read identification tag 802. For example, if identification tag 802 is a radio frequency identification tag, identification tag will provide a machine readable identification code in response to a query from identification tag reader 804. In this case, identifier database 806 stores description pairs that associate the machine readable codes produced by identification tags with human readable descriptors. For example, a description pair for the machine readable identification code "10101010111111" associated with identification tag 802 would be paired with a human readable item description of item 800, such as "orange juice." An item description is a human understandable description of an item. Human understandable descriptions are for example, text, audio, graphic, or other representations suited for display or audible output.

Figure 9:
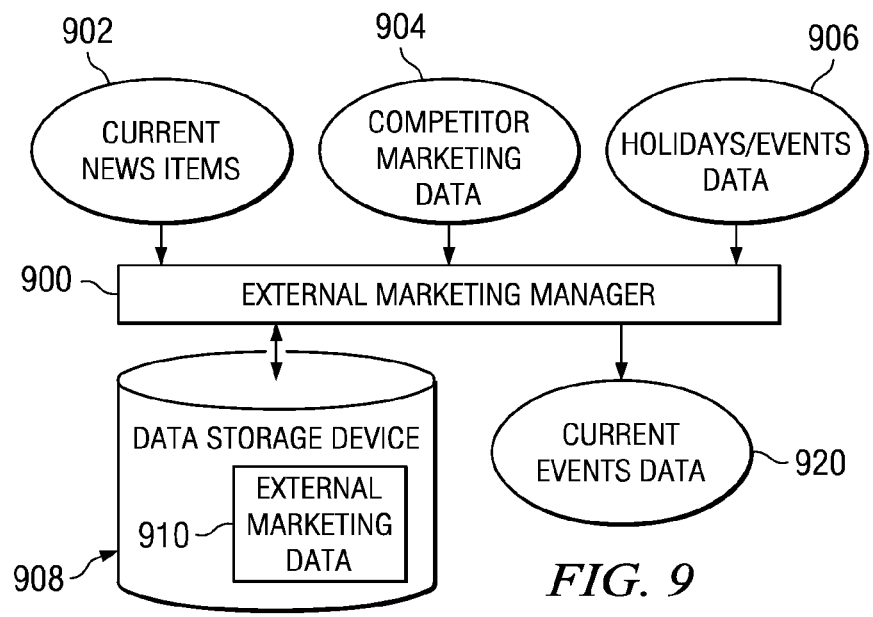
FIG. 9 is a block diagram illustrating an external marketing manager for generating current events data in accordance with an illustrative embodiment.

FIG. 9 is a block diagram illustrating an external marketing manager for generating current events data in accordance with an illustrative embodiment. External marketing manager 900 is a software component for collecting current news item 902, competitor marketing data 904, holidays and/or events data 906, and/or any other current events or news data from a set of sources. The set of sources may include one or more sources. A source may be, without limitation, a newspaper, catalog, a web page or other network resource, a television program or commercial, a flier, a pamphlet, a book, a booklet, a news board, a coupon board, a news group, a blog, a magazine, or any other paper or electronic source of information. A source may also include information provided by a human user.

External marketing manager 900 stores current news item 902, competitor marketing data 904, holidays and/or events data 906, and/or any other current events or news data in data storage device 908 as external marketing data 910. Data storage device 908 may be implemented as any type of data storage device, including, without limitation, a hard disk, a database, a main memory, a flash memory, a random access memory (RAM), a read only memory (ROM), or any other data storage device.

In this example, external marketing manager 900 filters or processes external marketing data 910 to form current events data 920. Filtering external marketing data 910 may include selecting data items or data objects associated with marketing one or more items to a customer. A data item or data object associated with marketing one or more items is a data element that may influence a customer's decision to purchase a product. For example, the occurrence of a sporting event may influence the sales of beer, pizza, and large screen televisions. A data element indicating the occurrence of a holiday, such as Christmas, may influence purchasing of toys, wrapping paper, candy canes, and other seasonal items. A data element indicating that it is raining or will rain all week may influence purchases of umbrellas and rain coats. These data elements that may influence customer purchases and sales of items are selected to form current events data 920. Current events data 920 is then sent to an analysis server, such as analysis server 602 in FIG. 6 for use in generating customized marketing messages to a customer.

In this example, external marketing manager 900 filters external marketing data 910 for relevant data elements to form current events data 920 without intervention by a human user. In another embodiment, a human user filters external marketing data 910 manually to generate current events data 920.

The analysis server uses the current events data to identify an event of interest to the customer that occurs within a predetermined period of time. For example, if a customer profile and dynamic data indicates that the customer is a football fan and current events data 920 indicates that the super bowl is playing on the upcoming weekend, the analysis server can identify items in a list of upsale items and items in a list of correlated items that are associated with the super bowl and football.

For example, items associated with football and the super bowl might include, without limitation, big screen televisions, beer, pizza, chips, and dip. These items in the lists of upsale items and/or list of correlated items that are related to the super bowl are then marketed in customized marketing messages to the customer to maximize purchases by the customer.

Figure 10:
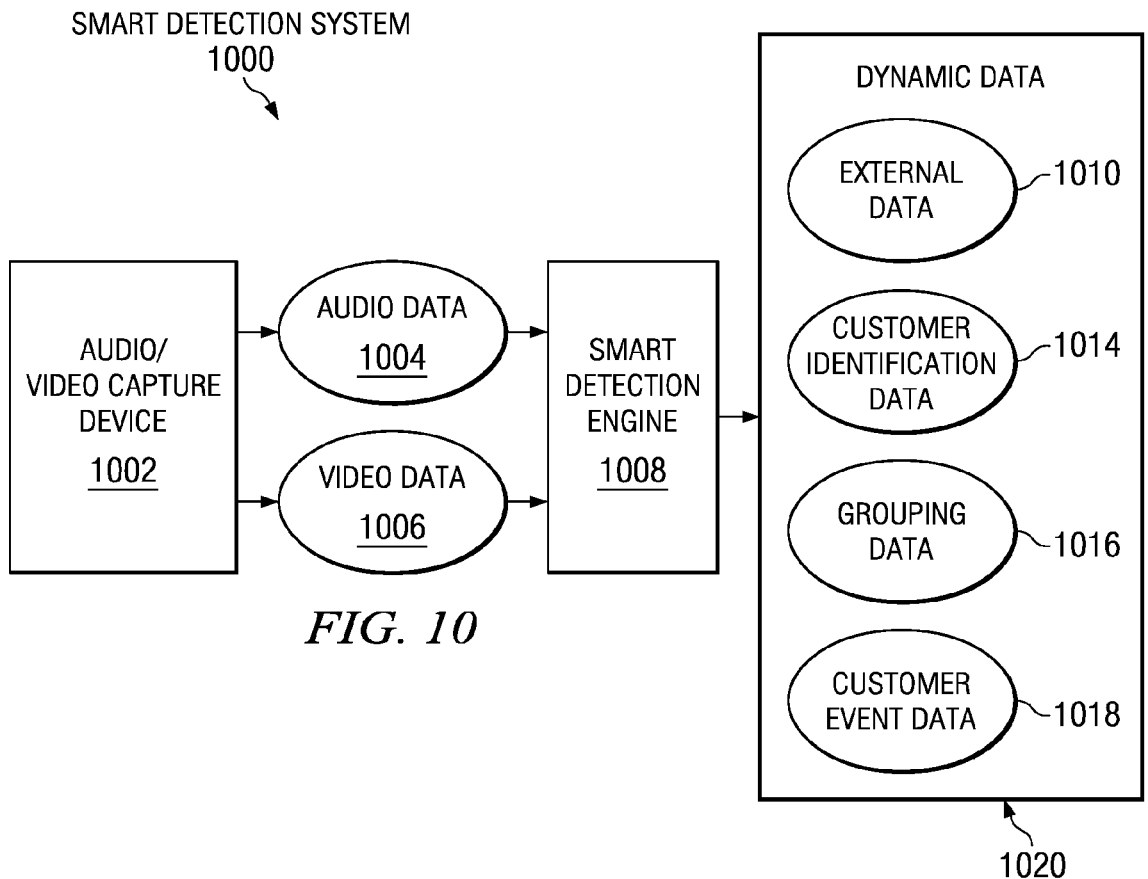
FIG. 10 is a block diagram illustrating a smart detection engine for generating dynamic data in accordance with an illustrative embodiment.

Referring now to FIG. 10, a block diagram illustrating a smart detection engine for generating dynamic data is shown in accordance with an illustrative embodiment. Smart detection system 1000 is a software architecture for analyzing detection data to form dynamic data 1020. In this example, the detection data is video images captured by a camera. However, the detection data may also include, without limitation, pressure sensor data captured by a set of pressure sensors, heat sensor data captured by a set of heat sensors, motion sensor data captured by a set of motion sensors, audio captured by an audio detection device, such as a microphone, or any other type of detection data described herein.

Audio/video capture device 1002 is a device for capturing video images and/or capturing audio. Audio/video capture device 1002 may be, but is not limited to, a digital video camera, a microphone, a web camera, or any other device for capturing sound and/or video images.

Audio data 1004 is data associated with audio captured by audio/video capture device 1002, such as human voices, vehicle engine sounds, dog barking, horns, and any other sounds. Audio data 1004 may be a sound file, a media file, or any other form of audio data. Audio/video capture device 1002 captures audio associated with a set of one or more customers inside a retail facility and/or outside a retail facility to form audio data 1004.

Video data 1006 is image data captured by audio/video capture device 1002. Video data 1006 may be a moving video file, a media file, a still picture, a set of still pictures, or any other form of image data. Video data 1006 is video or images associated with a set of one or more customers inside a retail facility and/or outside a retail facility.

For example, video data 1006 may include images of a customer's face, an image of a part or portion of a customer's car, an image of a license plate on a customer's car, and/or one or more images showing a customer's behavior. An image showing a customer's behavior or appearance may show a customer wearing a long coat on a hot day, a customer walking with two small children which may be the customer's children or grandchildren, a customer moving in a hurried or leisurely manner, or any other type of behavior or appearance attributes of a customer, the customer's companions, or the customer's vehicle.

Audio/video capture device 1002 transmits audio data 1004 and video data 1006 to smart detection engine 1008. Audio data 1004 and video data 1006 may be referred to as detection data. Smart detection engine 1008 is software for analyzing audio data 1004 and video data 1006. In this example, smart detection engine 1008 processes audio data 1004 and video data 1006 into data and metadata to form dynamic data 1012. Processing the audio data 1004 and video data 1006 may include filtering audio data 1004 and video data 1006 for relevant data elements, analyzing audio data 1004 and video data 1006 to form metadata describing or categorizing the contents of audio data 1004 and video data 1006, or combining audio data 1004 and video data 1006 with other audio data, video data, and data associated with a group of customers received from detectors, such as detectors 204-210 and set of detectors 212 in FIG. 2.

Smart detection engine 1008 uses computer vision and pattern recognition technologies to analyze audio data 1004 and/or video data 1006. Smart detection engine 1008 includes license plate recognition technology which may be deployed in a parking lot or at the entrance to a retail facility where the license plate recognition technology catalogs a license plate of each of the arriving and departing vehicles in a parking lot associated with the retail facility.

Smart detection engine 1008 includes behavior analysis technology to detect and track moving objects and classify the objects into a number of predefined categories. As used herein, an object may be a human customer, an item, a container, a shopping cart or shopping basket, or any other object inside or outside the retail facility. Behavior analysis technology could be deployed on various cameras overlooking a parking lot, a perimeter, or inside a facility.

Face detection/recognition technology may be deployed in parking lots, at entry ways, and/or throughout the retail facility to capture and recognize faces. Badge reader technology may be employed to read badges. Radar analytics technology may be employed to determine the presence of objects. Events from access control technologies can also be integrated into smart detection engine 1008.

The events from all the above detection technologies are cross indexed into a single repository, such as multi-mode database. In such a repository, a simple time range query across the modalities will extract license plate information, vehicle appearance information, badge information, and face appearance information, thus permitting an analyst to easily correlate these attributes.

Smart detection system 1000 may be implemented using any known or available software for performing voice analysis, facial recognition, license plate recognition, and sound analysis. In this example, smart detection system 1000 is implemented as IBM® smart surveillance system (S3) software.

The data gathered from the behavior analysis technology, license plate recognition technology, face detection/recognition technology, badge reader technology, radar analytics technology, and any other video/audio data received from a camera or other video/audio capture device is received by smart detection engine 1008 for processing into dynamic data 1020. Dynamic data 1020 includes external data 1010, customer identification data 1014, grouping data 1016, and customer behavior data 1018.

Figure 11:
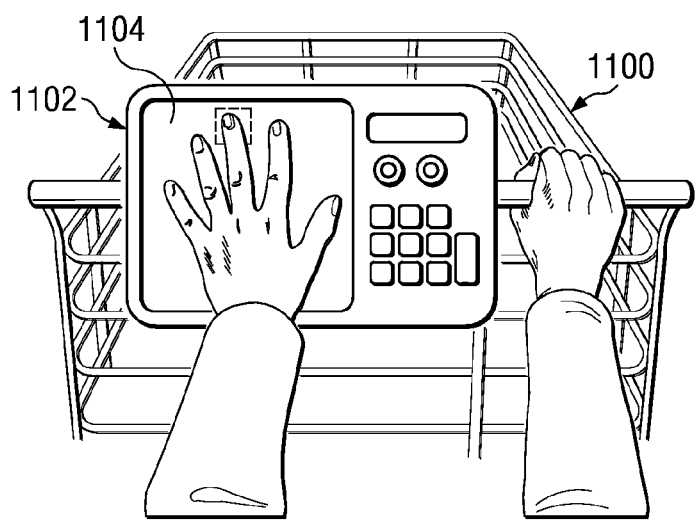
FIG. 11 is a block diagram of a shopping container in accordance with an illustrative embodiment.

FIG. 11 is a block diagram of a shopping container in accordance with an illustrative embodiment. Shopping container 1100 is a container for carrying, moving, or holding items selected by a customer, such as container 220 in FIG. 2. In this example, container 1100 is a shopping cart.

Display device 1102 is a multimedia display device for presenting or displaying customized digital marketing messages to one or more customers, such as display devices 226 in FIG. 2, personal digital assistant 400 in FIG. 4, personal digital assistant 500 in FIG. 5, and/or display device 630 in FIG. 6. In this example, display device is coupled to shopping container 1100. Display device 1102 displays customized digital marketing messages received from a derived marketing messages device, such as derived marketing messages 626 in FIG. 6.

Biometric device 1104 is any type of known or available device for measuring a physiological response or trait associated with a customer. Biometric device 1104 is a biometric device, such as, without limitation, biometric device 222 in FIG. 2. Biometric device 1104 may be a biometric device for measuring a customer's heart rate over a given period of time, a change in voice stress for the customer's voice, a change in blood pressure, and/or a change in pupil dilation that does not correlate or correspond to a change in an ambient lighting level.

In this example, biometric device 1104 is coupled to shopping container 1100. Biometric device 1104 monitors biometric readings of a customer and detects changes in the biometric readings of the customer that exceeds a threshold change. In this example, biometric device 1104 is a device for measuring a customer's heart rate over time. Biometric device 1104 obtains the customer's pulse rate by measuring the customer's finger pulse.

In another embodiment, biometric device 1104 may also identify a customer based on a fingerprint scan, voiceprint analysis, and/or retinal scan. For example, biometric device 1104 may dynamically identify the customer by scanning the customer's fingerprint and/or analyzing fingerprint data associated with the customer to determine the customer's identity. In one example, biometric device 1104 may, but is not required to, connected to a remote data storage device storing data to retrieve customer fingerprint data for use in identifying a given customer using the customer's fingerprint. Biometric device 1104 may be connected to the remote data storage device via a wireless network connection, such as network 102 in FIG. 1.

In this example, biometric device 1104 is coupled, attached, or imbedded in a handle of shopping container 1100. However, biometric device 1104 may be coupled, attached, or imbedded in or on any part or member of shopping container 1100.

In another embodiment, biometric device 1104 is coupled, attached, associated with, or imbedded within display device 1102. In this example, display device 1102 may use biometric device 1104 to dynamically identifying the customer by scanning the customer's fingerprint and/or analyzing data associated with the customer's fingerprint to determine the customer's identity.

Figure 12:
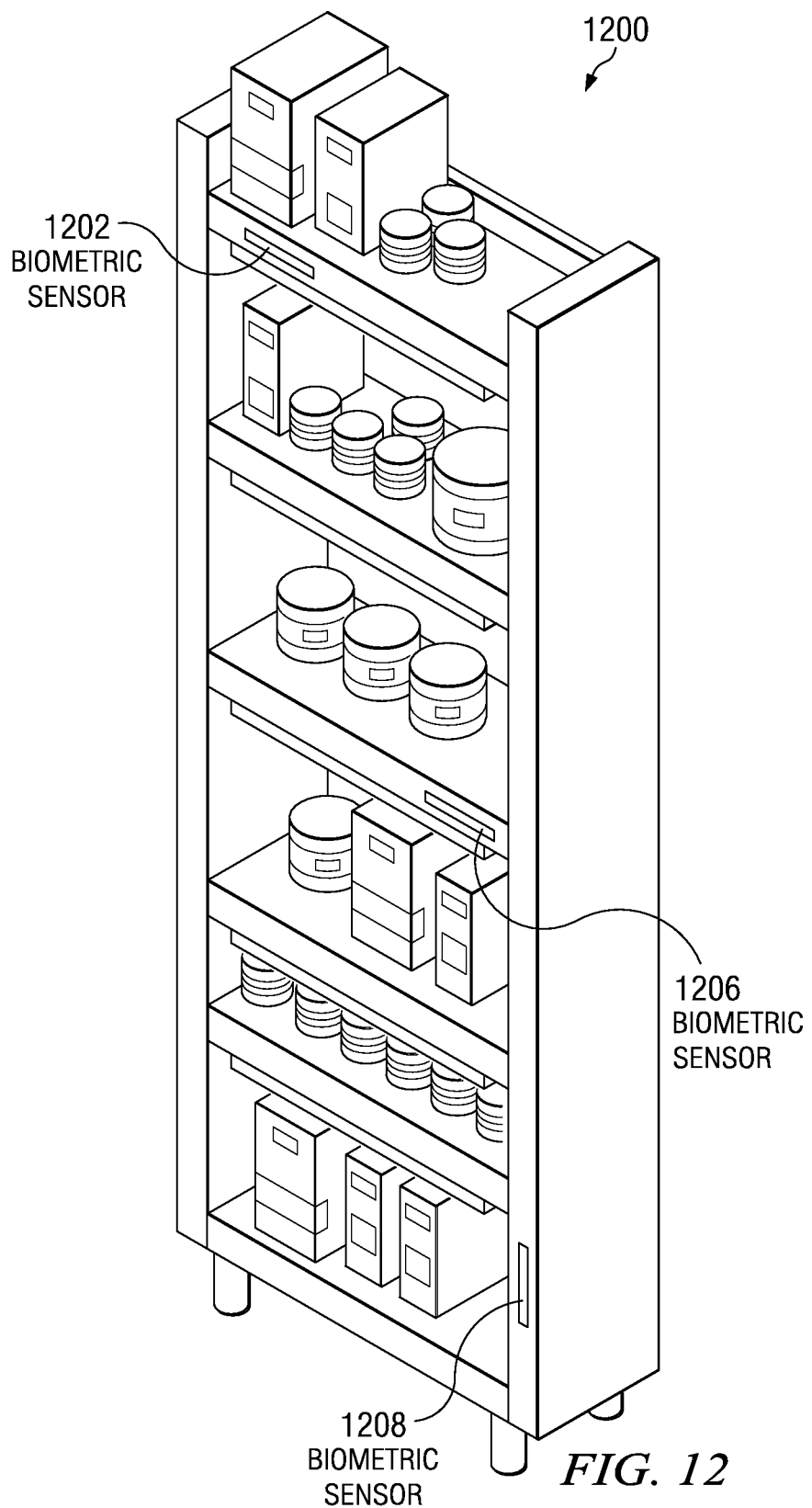
FIG. 12 is a block diagram of a shelf in a retail facility in accordance with an illustrative embodiment.

FIG. 12 is a block diagram of a shelf in a retail facility in accordance with an illustrative embodiment. Shelf 1200 is any type of device for showing, displaying, storing, or holding items. Shelf 1200 may be a shelf in a refrigerator or a freezer, as well as a shelf at room temperature. Shelf 1200 includes biometric sensors 1202-1208 for detecting biometric data associated with a customer. When a customer is standing in proximity to shelf 1200, such as when a customer is shopping, browsing, and/or selecting one or more items for purchase, biometric sensors 1202-1208 monitor biometric readings associated with the customer, such as, without limitation, the customer's heart rate, respiration rate, body temperature, pupil dilation, fingerprint, thumbprint, and/or any other biometric data. The customer's positive and negative reactions to customized marketing messages and/or items offered for sale are determined by analyzing the biometric data gathered by biometric sensors 1202-1208.

Turning now to FIG. 13, a block diagram illustrating a list of correlated items for promoting cross sales of related items is depicted in accordance with an illustrative embodiment. Correlated items list 1300 is a list of selected items 1302 and correlated items 1304 that provide a different basic functionality than selected item 1302. Correlated items list 1300 is a list, such as correlated items list 614 in FIG. 6.

Correlated items list 1300 is generated by analyzing items that are frequently purchased together by customers. For example, if a customer purchases peanut butter 1306, it is likely that the customer will also purchase jelly and/or bread. The correlation between products is not always a two-way correlation. If a customer purchases cereal 1308, most of the time, the customer will also purchase milk. However, customers that select milk for purchase may not be significantly more likely to purchase cereal.

In some cases, this correlation of different items that are purchased in conjunction is a two way correlation. For example, if a customer selects spaghetti pasta 1310, it is very likely that the customer will also purchase spaghetti sauce. Likewise, if a customer first selects spaghetti sauce 1312, there is a significant probability that the customer will also purchase spaghetti pasta.

In addition, the correlation may be a correlation between a single selected item 1302 and two or more correlated items. For example, if a customer selects pizza sauce 1314, there may be a high likelihood that the customer will also be interested in purchasing both pizza crust and pizza cheese.

The process identifies an item selected by a customer for purchase and then uses correlated items list 1300 to identify one or more correlated items that the customer is most likely to be interested in purchasing.

FIG. 14 is a block diagram illustrating a list of upsale items corresponding to selected items in accordance with an illustrative embodiment. Upsale items list 1400 is a list of items that provide a same basic functionality as selected item 1402. The upsale items provide an additional feature or functionality over selected item 1404, such as, but not limited to, a different size, different ingredients, different method of operation, different method of replacement or disposal, different packaging, different price than selected item 1402, or any combination of these features and functionalities. For example, if a selected item is a six-pack of root beer 1406, upsale items for the selected item include, without limitation, a larger twelve-pack size root beer, a twenty-four pack root beer, a two liter bottle of root beer, or a combination of a two-litter of root beer and ice cream.

Thus, the upsale item may include a combination of an upsale item providing a same basic functionality and a correlated item that provides a different basic functionality. In this case, ice cream provides a different basic functionality than root beer, but ice cream may be likely to be purchased by the customer in conjunction with root beer. Therefore, a marketing message for the upsale item includes an offer, discount, or incentive for both the upsale item two liter root beer and the correlated cross-sale item of ice cream.

The upsale item may be a different size or different number of items. For example, a sixty count bottle of vitamins 1408 may be associated with an upsale item of one-hundred count vitamins. The upsale item may also be a different brand than the selected item. If the customer selects brand "X" pizza 1410, the upsale item can be a different brand "Y" pizza 1404.

Referring now to FIG. 15, a flowchart illustrating a process for generating a customized marketing message for promoting cross sales of items related to an item selected by a customer is depicted in accordance with an illustrative embodiment. The process in FIG. 15 is implemented by a server, such as analysis server 602 in FIG. 6.

The process begins by identifying an item selected by a customer (step 1502). The process retrieves a list of correlated items related to the selected item (step 1504). The process selects a set of items in the list of correlated items using biometric data for the customer to form a set of promoted items (step 1506). In other words, the process determines whether a customer reacts to marketing messages and/or items offered for sale and selects items in the set of items based on the customer's reactions. The process then generates a customized marketing message for one or more correlated items in the set of promoted items (step 1508) to encourage the customer to purchase the correlated items in addition to purchasing the selected item. The process terminates.

FIG. 16 is a flowchart illustrating a process for generating a list of items purchased in correlation with a selected item in accordance with an illustrative embodiment. The process in FIG. 16 is implemented by a server, such as analysis server 602 in FIG. 6.

The process begins by identifying a plurality of items purchased by a set of one or more customers (step 1602). The process analyzes the plurality of items using data mining and/or other correlation analysis techniques to identify correlated items (step 1604). A correlation analysis technique is any known analysis that compares items purchased together by customers, identifies items that tend to be purchased in conjunction with one or more other items, and/or generates a rate or frequency with which individual items are purchased in conjunction with one or more other items.

The process stores the correlated items in a data storage device (step 1606) to form a correlated items list. The process terminates.

Turning now to FIG. 17, a flowchart illustrating a process for generating a customized marketing message for promoting upsales of items is shown in accordance with an illustrative embodiment. The process in FIG. 17 is implemented by a server, such as analysis server 602 in FIG. 6.

The process begins by identifying an item selected by a customer (step 1702). The process retrieves a list of upsale items associated with the selected item (step 1704). The process selects a set of items in the list of upsale items using biometric data for the customer to form the set of promoted items (step 1706). The process then generates a customized marketing message for an item in the list of upsale items (step 1706) with the process terminating thereafter.

Figure 18:
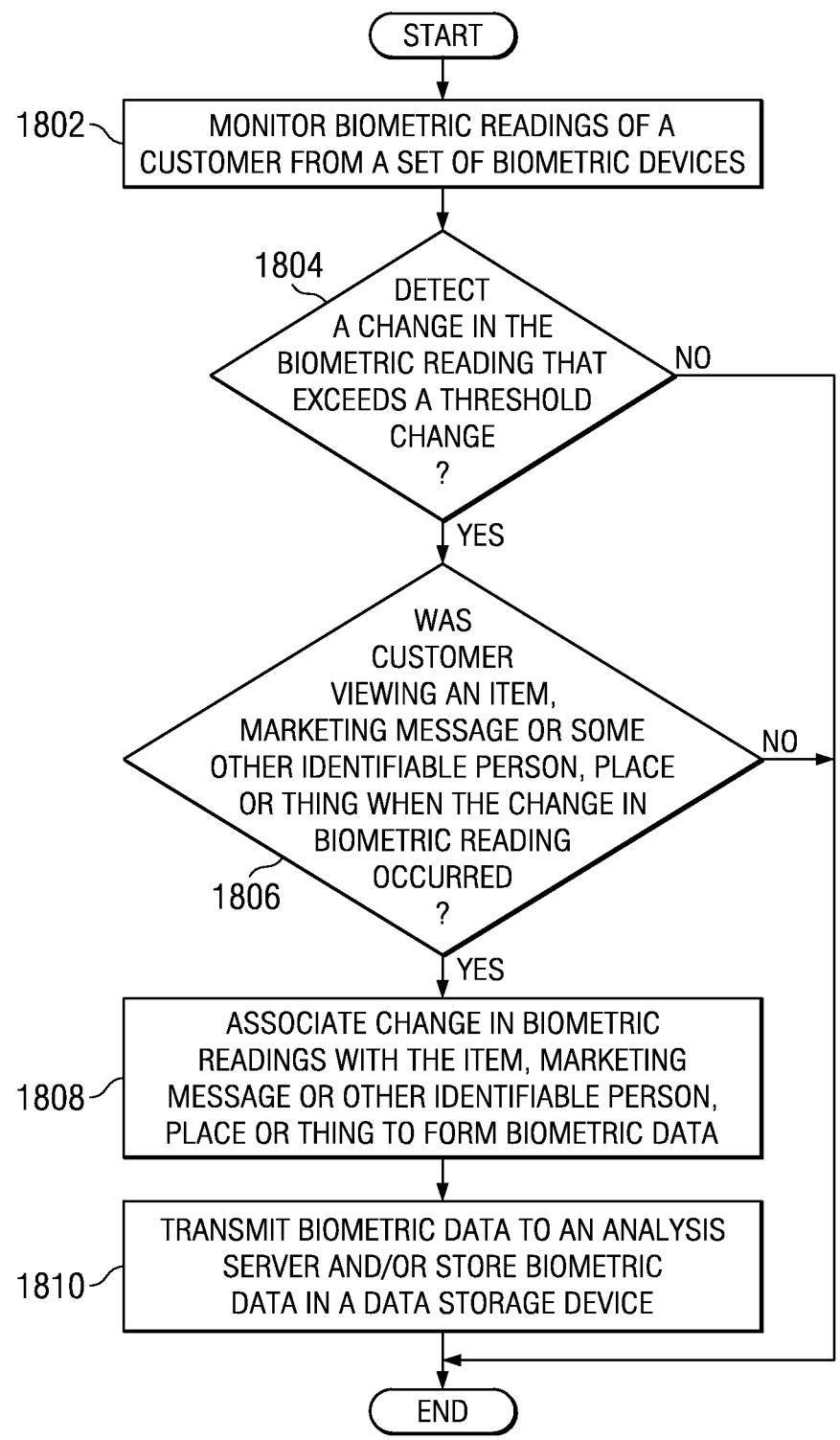
FIG. 18 is a flowchart illustrating a process for monitoring for a change in biometric readings associated with a customer in accordance with an illustrative embodiment.

Turning now to FIG. 18, a flowchart illustrating a process for monitoring for a change in biometric readings associated with a customer is depicted in accordance with an illustrative embodiment. The process may be implemented by a device for measuring physiological responses and/or traits of a customer, such as biometric device 218 and 222 in FIG. 2 and/or biometric device 1104 in FIG. 11.

The process begins by monitoring biometric readings of a customer obtained from a set of one or more biometric devices (step 1802). The process makes a determination as to whether a change in the biometric readings that exceeds a threshold change has been detected (step 1804). If a change exceeding the threshold is not detected, the process terminates thereafter.

Returning to step 1804, if a change exceeding the threshold is detected, the process makes a determination as to whether the customer was viewing an item, a marketing message, or some other identifiable person, place, or thing when the change in biometric readings occurred (step 1806). If the customer was not viewing an item, a marketing message, or some other identifiable person, place, or thing, the process terminates thereafter.

Returning to step 1806, if the customer was viewing an item, marketing message, or something else identifiable, the process associates the change in biometric reading with the item, the marketing message, or the identifiable person, place, or thing to form the biometric data (step 1808). The process transmits the biometric data to an analysis server and/or stores the biometric data in a data storage device for later use in generating customized marketing messages in the future (step 1810) with the process terminating thereafter.

Figure 19:
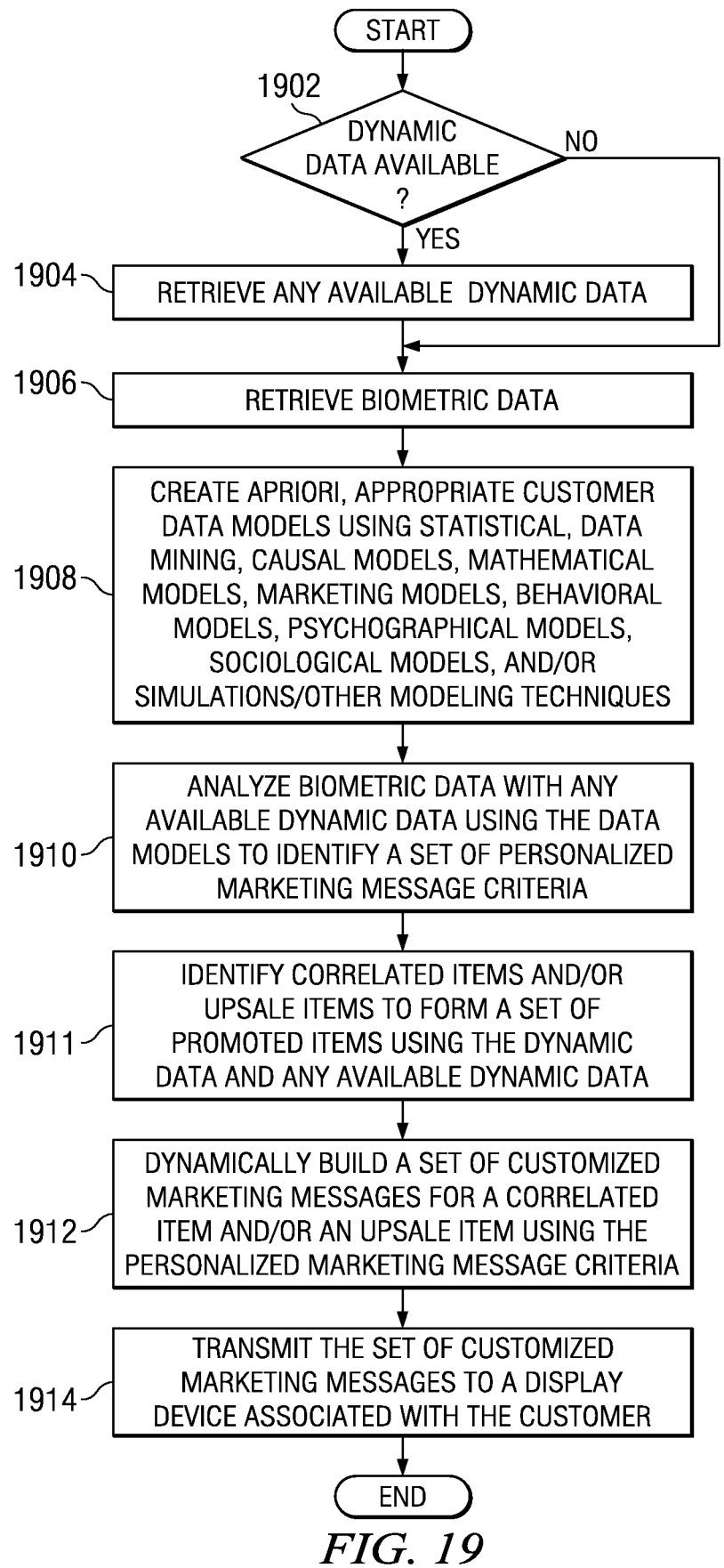
FIG. 19 is a flowchart illustrating a process for generating a customized marketing message cross-sales and upsales of items using dynamic data in accordance with an illustrative embodiment.

FIG. 19 is a flowchart illustrating a process for generating a customized marketing message cross-sales and upsales of items using dynamic data in accordance with an illustrative embodiment. The process in FIG. 19 is implemented by a server, such as analysis server 602 in FIG. 6.

The process begins by making a determination as to whether any dynamic data for the customer is available (step 1902). Dynamic data includes, without limitation, external data, grouping data, customer behavior data, current events data, and/or customer identification data, and/or vehicle identification data. If dynamic data is available, the process retrieves the dynamic data (step 1904). The process then retrieves biometric data for the customer (step 1906). The identification data includes vehicle identification data.

The process pre-generates or creates in advance, appropriate data models using at least one of a statistical method, data mining method, causal model, mathematical model, marketing model, behavioral model, psychographical model, sociological model, simulations/modeling techniques, and/or any combination of models, data mining, statistical methods, simulations and/or modeling techniques (step 1908).

The process analyzes biometric data with any available dynamic data using one or more of the appropriate data models to identify a set of personalized marketing message criteria (step 1910). The set of personalized marketing message criteria may include one or more criterion for generating a personalized marketing message. The process also uses the biometric data and any available dynamic data to identify correlated items and/or upsale items to form the set of promoted items (1911).

The process dynamically builds a set of one or more customized marketing messages for at least one correlated item and/or at least one upsale item using the personalized marketing message criteria (step 1912). The process transmits the set of customized marketing messages to a display device associated with the customer (step 1914) for presentation of the marketing message to the customer, with the process terminating thereafter.

Thus, the illustrative embodiments provide a computer implemented method, apparatus, and computer usable program code for generating customized marketing messages to increase purchases by a customer. In one embodiment, an item selected by the customer is identified to form a selected item. Biometric readings for the customer are received from a set of biometric devices associated with a retail facility to form the biometric data. The biometric data is data regarding a set of physiological responses of the customer. A set of items is selected from a list of items associated with the selected item using the biometric data for the customer to form a set of promoted items. A customized marketing message for the customer is generated using a set of personalized marketing message criteria for the customer. The customized marketing message comprises a marketing message for the set of promoted items.

The process permits merchants and retail stores to increase profit and revenue by increasing the effectiveness of marketing upsale items and correlated cross-sale items to customers. The customized marketing message is customized to the customer and the customer's unique, dynamically changing circumstances at the time the customized marketing message is presented to the customer. Thus, if the customer is shopping with children, the customized marketing messages will be adapted to take advantage of the fact that the customer may be interested in products for children. In addition, the customized marketing messages can be generated using imagery, phrases, jingles, and marketing elements that would appeal to a parent of small children.

If the biometric data and, optionally, any available dynamic data, indicates the customer is in a hurry and shopping with children, upsale and cross sale products for microwaveable meals targeted towards children are generated. Likewise, shorter marketing messages are generated to take into account the fact that the customer appears to be rushed and possibly unwilling to give an extended amount of attention to a marketing message. In this manner, profits and revenues are increased by improving marketing of upsale and cross-sale items to customers.

Biometric data may be used to determine if a user is interested or disinterested in an item or advertisement based on changes in biometric data that exceed a threshold or baseline change. For example, a change in heart rate or pupil dilation may indicate an interest or desire in a particular product. Also, data such as voice stress may be used to determine if a customer is receptive to advertising at the current moment, if the customer is stressed, tired, or relaxed. This data may be used to customize marketing messages in real time based on the customer's current mood and responses to the environment and changing stimuli presented to the customer to improve marketing effectiveness.

The flowcharts and block diagrams in the different depicted embodiments illustrate the architecture, functionality, and operation of some possible implementations of apparatus, methods and computer program products. In this regard, each step in the flowchart or block diagrams may represent a module, segment, or portion of code, which comprises one or more executable instructions for implementing the specified function or functions. In some alternative implementations, the function or functions noted in the step may occur out of the order noted in the figures. For example, in some cases, two steps shown in succession may be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for generating customized marketing messages to increase purchases by a customer, the computer implemented method comprising:
   receiving external data associated with the customer from a set of detectors located externally to a retail facility to form external data;
   identifying an item selected by the customer to form a selected item;
   receiving, by a processor, biometric readings for the customer from a set of biometric devices associated with the retail facility to form biometric data, wherein the biometric data is data regarding a set of physiological responses of the customer;
   processing the external data with the biometric data to form dynamic data;
   analyzing the dynamic data using a set of data models to identify personalized marketing message criteria for the customer;
   selecting a set of items from a list of items associated with the selected item using the dynamic data for the customer to form a set of promoted items; and
   generating a customized marketing message for the customer using the personalized marketing message criteria and the set of promoted items, wherein the customized marketing message comprises a marketing message promoting a sale of the set of promoted items.

2. The computer implemented method of claim 1 wherein the customer is a customer in a set of customers and further comprising:
   receiving data associated with the set of customers from detectors associated with the retail facility to form detection data;
   processing the detection data for the set of customers to form grouping data for the customer;
   analyzing the biometric data with the grouping data to form the dynamic data;
   analyzing the dynamic data using a set of data models to identify the personalized marketing message criteria for the customer;
   selecting the set of items from the list of items associated with the selected item using the dynamic data for the customer to form the set of promoted items; and
   generating the customized marketing message for the customer using the personalized marketing message criteria and the set of promoted items.

3. The computer implemented method of claim 2 wherein the grouping data identifies a grouping category for the customer, and wherein the grouping category is selected from a group consisting of parents with children, teenagers, children, minors unaccompanied by adults, minors accompanied by adults, grandparents with grandchildren, senior citizens, couples, friends, coworkers, a customer with a pet, and a customer shopping alone, and further comprising:
   identifying items in the list of items associated with the selected item that are frequently purchased by customers in the grouping category for the customer to form a set of frequently purchased items; and
   using the biometric data to identify items in the set of frequently purchased items to market to the customer to form the set of promoted items.

4. The computer implemented method of claim 1 further comprising:
   receiving external marketing data from a set of sources to form current events data;
   processing the current events data with the biometric data to form the dynamic data;
   analyzing the dynamic data using a set of data models to identify the personalized marketing message criteria for the customer;
   selecting the set of items from the list of items associated with the selected item using the dynamic data for the customer to form the set of promoted items; and
   generating the customized marketing message for the customer using the personalized marketing message criteria, wherein the customized marketing message provides an incentive to purchase at least one item in the set of promoted items.

5. The computer implemented method of claim 4 further comprising:
   responsive to a determination that the current events data indicates an event of interest to the customer occurs within a predetermined period of time, identifying items in the list of items associated with the selected item and the event of interest to form a set of items of interest to the customer; and
   using the biometric data to identify items in a set of items of interest to market to the customer to form the set of promoted items.

6. The computer implemented method of claim 1 further comprising:
   receiving data associated with the customer from a set of cameras associated with the retail facility to form detection data for the customer;
   processing the detection data, by a smart detection engine, to form event data, wherein the event data describes events associated with the customer;
   analyzing the event data to identify patterns of events to form customer behavior data;
   processing the customer behavior data with the biometric data to form the dynamic data;
   analyzing the dynamic data using a set of data models to identify the personalized marketing message criteria for the customer;
   identifying items in the list of items associated with the selected item using the dynamic data to form the set of promoted items, wherein the customer behavior data and the biometric data indicates an interest of the customer in receiving marketing messages associated with at least one item in the set of promoted items; and
   generating the customized marketing message for the customer using the personalized marketing message criteria and the set of promoted items.

* * * * *